United States Patent
Mimura et al.

(10) Patent No.: US 10,062,923 B2
(45) Date of Patent: Aug. 28, 2018

(54) SOLID ELECTROLYTE COMPOSITION, ELECTRODE SHEET FOR BATTERY AND ALL-SOLID SECONDARY BATTERY USING THE SAME, AND METHOD FOR MANUFACTURING ELECTRODE SHEET FOR BATTERY AND ALL-SOLID SECONDARY BATTERY

(71) Applicant: FUJIFILM Corporation, Tokyo (JP)

(72) Inventors: Tomonori Mimura, Kanagawa (JP); Hiroaki Mochizuki, Kanagawa (JP); Masaomi Makino, Kanagawa (JP); Katsuhiko Meguro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 58 days.

(21) Appl. No.: 15/245,500

(22) Filed: Aug. 24, 2016

(65) Prior Publication Data

US 2016/0365604 A1 Dec. 15, 2016

Related U.S. Application Data

(63) Continuation of application No. PCT/JP2015/055272, filed on Feb. 24, 2015.

(30) Foreign Application Priority Data

Feb. 25, 2014 (JP) .................. 2014-033902

(51) Int. Cl.
*H01M 10/0562* (2010.01)
*C08F 265/06* (2006.01)
*H01M 10/0525* (2010.01)
*C08F 290/04* (2006.01)
(Continued)

(52) U.S. Cl.
CPC ....... *H01M 10/0562* (2013.01); *C08F 265/06* (2013.01); *C08F 290/042* (2013.01); *H01M 10/0525* (2013.01); *H01M 6/18* (2013.01); *H01M 10/052* (2013.01); *H01M 2300/0068* (2013.01)

(58) Field of Classification Search
CPC ......... H01M 10/0562; H01M 10/0525; H01M 6/18; H01M 10/052; H01M 2300/0068; C08F 290/042; C08F 265/06
See application file for complete search history.

(56) References Cited

U.S. PATENT DOCUMENTS

2014/0127579 A1* 5/2014 Yoshida ................. H01B 1/122
429/217

FOREIGN PATENT DOCUMENTS

| JP | 11-86899 A | 3/1999 |
|---|---|---|
| JP | 2013-008611 A | 1/2013 |
| JP | 2013-8667 A | 1/2013 |

(Continued)

OTHER PUBLICATIONS

International Search Report for PCT/JP2015/055272 dated Jun. 2, 2015 [PCT/ISA/210].

*Primary Examiner* — Stewart A Fraser
(74) *Attorney, Agent, or Firm* — Sughrue Mion, PLLC

(57) ABSTRACT

A solid electrolyte composition includes an inorganic solid electrolyte, a binder which is formed of core-shell type particles which have a core section and a shell section, and a dispersive medium, in which a difference between a glass transition temperature of a polymer compound which forms the core section and a glass transition temperature of a polymer compound which forms the shell section is 50° C. or more.

20 Claims, 2 Drawing Sheets

(51) Int. Cl.
*H01M 10/052* (2010.01)
*H01M 6/18* (2006.01)

(56) References Cited

FOREIGN PATENT DOCUMENTS

| | | |
|---|---|---|
| JP | 2013-12357 A | 1/2013 |
| JP | 2013-175396 A | 9/2013 |
| WO | 2012/173089 A1 | 12/2012 |

* cited by examiner

SOLID ELECTROLYTE COMPOSITION, ELECTRODE SHEET FOR BATTERY AND ALL-SOLID SECONDARY BATTERY USING THE SAME, AND METHOD FOR MANUFACTURING ELECTRODE SHEET FOR BATTERY AND ALL-SOLID SECONDARY BATTERY

CROSS-REFERENCE TO RELATED APPLICATIONS

This application is a Continuation of PCT International Application No. PCT/JP2015/055272 filed on Feb. 24, 2015, which claims priority under 35 U.S.C. § 119 (a) to Japanese Patent Application No. JP2014-033902 filed in Japan on Feb. 25, 2014. Each of the above applications is hereby expressly incorporated by reference, in its entirety, into the present application.

BACKGROUND OF THE INVENTION

1. Field of the Invention

The present invention relates to a solid electrolyte composition, an electrode sheet for a battery and an all-solid secondary battery using the same, and a method for manufacturing an electrode sheet for a battery and an all-solid secondary battery.

2. Description of the Related Art

Currently, many commonly used lithium ion batteries use an electrolytic solution. Attempts are being made to replace this electrolytic solution with a solid electrolyte and make all of the constituent materials solid. In this regard, first among the advantages of the techniques which use an inorganic solid electrolyte is reliability. Combustible materials such as carbonate-based solvents are put to use in the electrolytic solution which is used for lithium ion secondary batteries as the media thereof. Although various countermeasures have been taken with respect to combustion, there is a demand for further measures to be provided at during overcharging or the like. An all-solid secondary battery consisting of an inorganic compound in which the electrolyte may be incombustible may be installed as a means for solving this demand.

A further advantage of an all-solid secondary battery is suitability for increasing the energy density by stacking the electrodes. In detail, it is possible to make a battery which has a structure where an electrode and an electrolyte are directly lined up in series. At this time, since it is possible to omit a metal package which seals a battery cell and a copper line or a bus bar which links to the battery cell, the energy density of the battery is greatly increased. In addition, the advantages also include good compatibility with a cathode material which is able to realize a high potential, and the like.

From each of the advantages as described above, the development of a next generation lithium ion secondary battery is actively under way (New Energy and Industrial Technology Development Organization, Fuel Cells and Hydrogen Technology Development Department, Electricity Storage Technology Development Division "NEDO 2008 Roadmap for the development of Next-Generation Automotive Battery Technology" (June, 2009)). On the other hand, an inorganic type all-solid secondary battery also has disadvantages since the electrolyte is a hard solid body. Examples of these disadvantages include the interface resistance between the solid particles being great. In order to improve this, there are examples which use a specific polymer compound as a binder. In detail, JP2013-008611A uses a surfactant which has a polyoxyethylene chain. JP1999-086899A (JP-H11-086899A) discloses the use of a hydrogenated butadiene copolymer.

SUMMARY OF THE INVENTION

According to the inventions in JP2013-008611A and JP1999-086899A (JP-H11-086899A) mentioned above, the increase of the interface resistance in an all-solid secondary battery may be reasonably improved. However, the binders consisting of polymer compounds which are disclosed in the publications described above are not able to satisfy the recent high level of demand and further improvement is necessary.

Thus, the present invention has an object of providing a solid electrolyte composition which is able to suppress an increase in interface resistance such as between solid particles and between solid particles and current collectors without applying pressure and to realize favorable ionic conductivity and binding properties in an all-solid secondary battery, an electrode sheet for a battery and an all-solid secondary battery using the solid electrolyte composition, and a method for manufacturing an electrode sheet for a battery and an all-solid secondary battery.

The problems were solved by the following means.

[1] A solid electrolyte composition comprising: an inorganic solid electrolyte: a binder which is formed of core-shell type particles which have a core section and a shell section; and a dispersive medium, in which a difference between a glass transition temperature of a polymer compound which forms the core section and a glass transition temperature of a polymer compound which forms the shell section is 50° C. or more.

[2] The solid electrolyte composition according to [1], in which the polymer compound which forms the binder includes a structure unit which is represented by Formula (1) or (2) below,

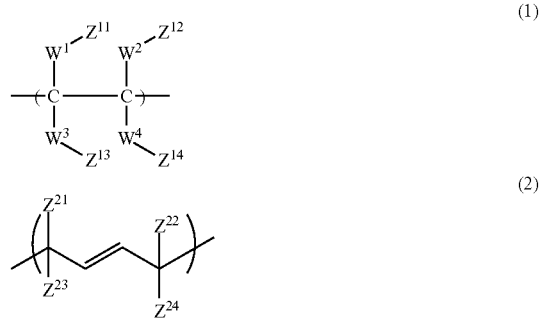

in the formulas, $W^1$ to $W^4$ each independently represent a single bond or a divalent linking group, $Z^{11}$ to $Z^{14}$ and $Z^{21}$ to $Z^{24}$ each independently represent a hydrogen atom or a substituent; where, at least one of $Z^{11}, \ldots,$ or $Z^{14}$ and at least one of $Z^{21}, \ldots,$ or $Z^{24}$ are a substituent, $W^1$ to $W^4$, $Z^{11}$ to $Z^{14}$, and $Z^{21}$ to $Z^{24}$ may bond with each other to form a cyclic structure, and $Z^{11}$ to $Z^{14}$ and $Z^{21}$ to $Z^{24}$ may be linked with another polymer chain which is represented by Formula (1) or (2).

[3] The solid electrolyte composition according to [1] or [2], in which an average particle diameter of the core-shell type particles which form the binder is 10 nm or more and 1,000 nm or less.

[4] The solid electrolyte composition according to any one of [1] to [3], in which the polymer compound which forms the binder includes a structure unit which is derived from a macromonomer (X) with a weight-average molecular weight of 1,000 or more.

[5] The solid electrolyte composition according to any one of [1] to [4], in which the polymer compound which forms the binder has at least one selected from the group (b) of functional groups below, group (b) of functional groups
a carbonyl group, an amino group, a carboxyl group, a sulfonic acid group, a phosphoric acid group, a phosphonic acid group, a hydroxy group, an oxy group, a cyano group, a sulfide group, and an imino group.

[6] The solid electrolyte composition according to any one of [1] to [5], in which the polymer compound which forms the binder includes a repeating unit which is derived from a monomer which is selected from a (meth)acrylic acid monomer, a (meth)acrylic acid ester monomer, and a (meth)acrylonitrile monomer.

[7] The solid electrolyte composition according to any one of [4] to [6], in which the macromonomer (X) includes a polymerizable double bond and a linear hydrocarbon structure unit with 6 or more carbon atoms.

[8] The solid electrolyte composition according to any one of [4] to [7], in which the macromonomer (X) is a monomer which is represented by any one of Formulas (b-13a) to (b-13c) below or a monomer which has a repeating unit which is represented by any one of Formulas (b-14a) to (b-14c) below,

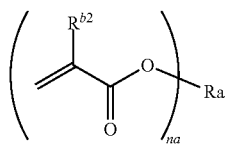
(b-13a)

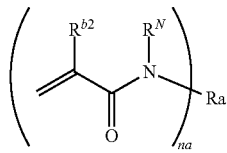
(b-13b)

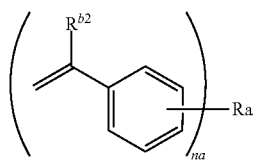
(b-13c)

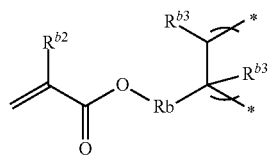
(b-14a)

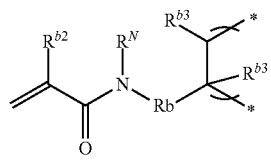
(b-14b)

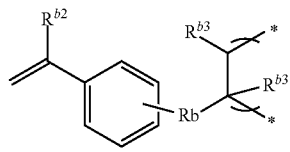
(b-14c)

in the formulas, $R^{b2}$ and $R^{b3}$ each independently represent a hydrogen atom, a hydroxy group, a cyano group, a halogen atom, an alkyl group, an alkenyl group, an alkynyl group, or an aryl group, Ra and Rb each independently represent a linking group; where, Ra is a monovalent substituent when na is 1, na represents an integer of 1 to 6, and $R^N$ is a hydrogen atom, an alkyl group with 1 to 6 carbon atoms, or an aryl group with 6 to 10 carbon atoms.

[9] The solid electrolyte composition according to any one of [1] to [8], in which the glass transition temperature of the core section of the binder is higher than the glass transition temperature of the shell section, or the glass transition temperature of the shell section of the binder is higher than the glass transition temperature of the core section.

[10] The solid electrolyte composition according to any one of [1] to [9], in which the glass transition temperature of the core section of the binder is 80° C. or more and the glass transition temperature of the shell section is 30° C. or less, or the glass transition temperature of the shell section of the binder is 80° C. or more and the glass transition temperature of the core section is 30° C. or less.

[11] The solid electrolyte composition according to any one of [1] to [10], in which the average particle diameter of the core-shell type particles which form the binder is 200 nm or less.

[12] The solid electrolyte composition according to any one of [1] to [11], in which the polymer compound which forms the binder has at least one selected from the group (c) of functional groups below, group (c) of functional groups
a carboxyl group, a sulfonic acid group, a phosphoric acid group, and a hydroxy group.

[13] The solid electrolyte composition according to any one of [1] to [12], further comprising: an active material which is able to insert and discharge metal ions which belong to group I or group II in the periodic table.

[14] The solid electrolyte composition according to any one of [1] to [13], in which the binder particles are contained at 0.1 parts by mass or more and 20 parts by mass or less with respect to 100 parts by mass of the inorganic solid electrolyte.

[15] The solid electrolyte composition according to any one of [1] to [14], in which the dispersive medium is selected from an alcohol compound solvent, an amide compound solvent, a ketone compound solvent, an ether compound solvent, an aromatic compound solvent, an aliphatic compound solvent, and a nitrile compound solvent.

[16] The solid electrolyte composition according to any one of [1] to [15], in which a ratio of a mass of the binder core section and a mass of the shell section is 5 parts by mass or more and 200 parts by mass or less of the shell section with respect to 100 parts by mass of the core section.

[17] An electrode sheet for a battery where the solid electrolyte composition according to any one of [1] to [16] is formed into a film on a metallic foil.

[18] An all-solid secondary battery comprising: a cathode active material layer, an anode active material layer; and an inorganic solid electrolyte layer, in which at least one of the cathode active material layer, the anode active material layer, or the inorganic solid electrolyte layer is formed of the solid electrolyte composition according to any one of [1] to [16].

[19] A method for manufacturing an electrode sheet for a battery, the method comprising: arranging the solid electrolyte composition according to any one of [1] to [16] on a metallic foil, and forming the composition into a film.

[20] A method for manufacturing an all-solid secondary battery via the manufacturing method according to [19].

In the present specification, when there are a plurality of substituents or linking groups which are represented by specific reference numerals or when a plurality of substituents or the like (the same applies to the regulation of the number of the substituents) are simultaneously or selectively regulated, each of the substituents or the like may be the same as or different from each other. In addition, when a plurality of substituents or the like are in the vicinity of each other, these may bond with each other or be condensed to form a ring.

When used as the material of an inorganic solid electrolyte layer or active material layer of an all-solid secondary battery, the solid electrolyte composition of the present invention exhibits excellent effects such as being able to suppress an increase in the interface resistance such as between solid particles and between solid particles and current collectors without applying pressure, and also to realize favorable ionic conductivity and binding properties.

The electrode sheet for a battery and the all-solid secondary battery of the present invention are provided with the solid electrolyte composition described above and exhibit the favorable performances described above. In addition, according to the manufacturing method of the present invention, it is possible to favorably manufacture the electrode sheet for a battery and the all-solid secondary battery described above.

The features and advantages described above and others of the present invention will be clearer from the description and diagrams below.

DESCRIPTION OF THE PREFERRED EMBODIMENTS

The solid electrolyte composition of the present invention includes an inorganic solid electrolyte and a binder consisting of core-shell particles. Description will be given below of preferable embodiments thereof and, firstly, description will be given of examples of an all-solid secondary battery which is a preferable form of application.

Figure 1:
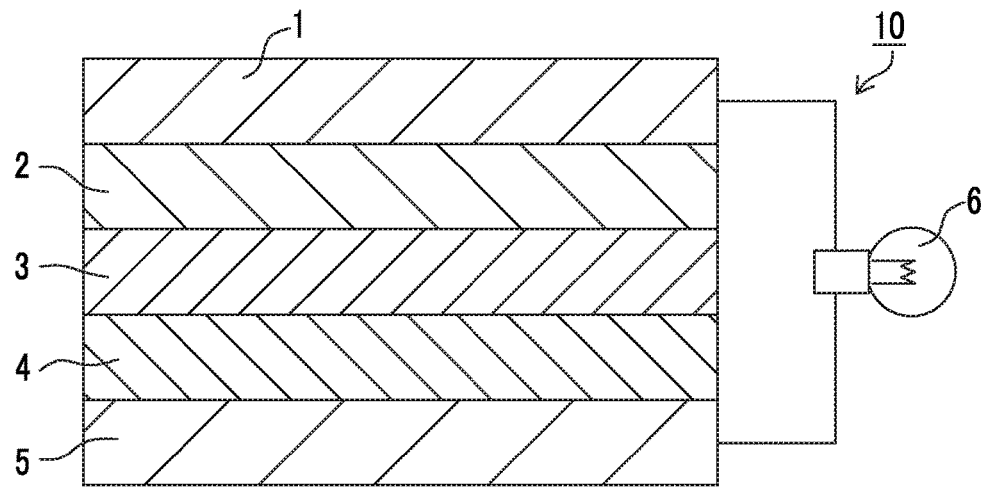
FIG. 1 is a cross-sectional diagram which schematically shows an all-solid lithium ion secondary battery according to a preferable embodiment of the present invention.

FIG. 1 is a cross-sectional diagram which schematically shows an all-solid secondary battery (a lithium ion secondary battery) according to a preferable embodiment of the present invention. An all-solid secondary battery 10 of the present embodiment has an anode current collector 1, an anode active material layer 2, an inorganic solid electrolyte layer 3, a cathode active material layer 4, and a cathode current collector 5 in this order from the anode side. Each of the layers is in contact with each other and has a laminated structure. By adopting this structure, during charging, electrons ($e^-$) are supplied to the anode side and lithium ions ($Li^+$) are accumulated therein. On the other hand, during discharging, lithium ions ($Li^+$) which are accumulated in the anode are returned to the cathode side and electrons are supplied to an operation site 6. In the example in the diagram, an electric light bulb is provided at the operation site 6 and the electric light bulb is lit by the discharging. The solid electrolyte composition of the present invention is preferably used as the constituent material of the anode active material layer, the cathode active material layer, and the inorganic solid electrolyte layer described above and, among these, preferably used as the constituent material of all of the inorganic solid electrolyte layer, the cathode active material layer, and the anode active material layer.

The thickness of the cathode active material layer 4, the inorganic solid electrolyte layer 3, and the anode active material layer 2 is not particularly limited; however, it is possible to arbitrarily determine the thickness of the cathode active material layer and the anode active material layer according to the target battery capacity. On the other hand, the inorganic solid electrolyte layer is desirably as thin as possible while preventing short circuits between the cathode and anode. In detail, 1 μm to 1,000 μm is preferable, and 3 μm to 400 μm is more preferable.

Here, a multifunctional layer may be appropriately interposed or arranged between or the outside of each of the layers of the anode current collector 1, the anode active material layer 2, the inorganic solid electrolyte layer 3, the cathode active material layer 4, and the cathode current collector 5 described above. In addition, each of the layers may be formed by a single layer or may be formed by a plurality of layers.

<Solid Electrolyte Composition>
(Inorganic Solid Electrolyte)

The inorganic solid electrolyte is a solid electrolyte which is inorganic and the solid electrolyte is an electrolyte in a solid form which is able to move ions in the inside thereof. From this viewpoint, the inorganic solid electrolyte may be called an ionically conductive inorganic solid electrolyte in consideration of the distinction from an electrolyte salt (supporting electrolyte) which will be described below.

Since organic matter, that is, carbon atoms, is not included, the inorganic solid electrolyte is clearly distinguished from an organic solid electrolyte (polymer electrolytes which are represented by PEO and the like and organic electrolyte salts which are represented by LiTFSI and the like). In addition, since an inorganic solid electrolyte is solid in a normal state, the inorganic solid electrolyte is not dissociated or isolated in cations and anions. In this point, the inorganic solid electrolyte is also clearly distinguished from inorganic electrolyte salts ($LiPF_6$, $LiBF_4$, LiFSI, LiCl, and the like) where cations and anions are dissociated or isolated in an electrolytic solution or a polymer. The inorganic solid electrolyte is not particularly limited as long as the inorganic solid electrolyte has conductivity for metal ions which belong to group I or group II in the periodic table and the inorganic solid electrolyte generally does not have electrical conductivity.

In the present invention, the inorganic solid electrolyte is contained in a solid electrolyte composition. Among these, an ionically conductive inorganic solid electrolyte is preferable. The ions at this time are preferably metal ions which belong to group I or group II in the periodic table. It is possible to use the inorganic solid electrolyte described above by appropriately selecting a solid electrolyte material which is applied to this type of product. Representative examples of the inorganic solid electrolyte include a (i) sulfide-based inorganic solid electrolyte and an (ii) oxide-based inorganic solid electrolyte.

(i) Sulfide-Based Inorganic Solid Electrolyte

The sulfide solid electrolyte preferably contains sulfur (S), has ionic conductivity for metal which belongs to group I or group II in the periodic table, and has an electrical insulation property. Examples thereof include lithium ionic conductive inorganic solid electrolytes which satisfy the composition which is indicated by Formula (1) below.

$$L_{a1}M_{b1}P_{c1}S_{d1}A_{e1} \qquad (I)$$

(In the formula, L indicates an element which is selected from Li, Na, and K, and Li is preferable. M indicates an element which is selected from B, Zn, Sn, Si, Cu, Ga, Sb, Al, and Ge. Among these, B, Sn, Si, Al, and Ge are preferable, and Sn, Al, and Ge are more preferable. A indicates I, Br, Cl, and F, I and Br are preferable, and I is particularly preferable. a1 to e1 indicate the compositional ratio of each element and a1:b1:c1:d1:e1 satisfies 1 to 12:0 to 1:1:2 to 12:0 to 5. Furthermore, a1 is preferably 1 to 9 and more preferably 1.5 to 4. b1 is preferably 0 to 0.5. Furthermore, d1 is preferably 3 to 7 and more preferably 3.25 to 4.5. Furthermore, e1 is preferably 0 to 3 and more preferably 0 to 1.)

In Formula (1), regarding the compositional ratio of L, M, P, S, and A, b1 and e1 are preferably 0, more preferably b1=0, and e1=0, and the ratio of a1, c1, and d1 (a1:c1:d1) is preferably a1:c1:d1=1 to 9:1:3 to 7, and b1=0, e1=0, and a1:c1:d1=1.5 to 4:1:3.25 to 4.5 is more preferable. It is possible to control the compositional ratio of each element by adjusting the blending amount of the raw material compounds when producing the sulfide-based solid electrolyte as will be described below.

The sulfide-based solid electrolyte may be non-crystalline (glass) or crystallized (made into a glass ceramic), and only a part may be crystallized.

In Li—P—S-based glass and Li—P—S-based glass ceramics, the ratio of $Li_2S$ and $P_2S_5$ is preferably 65:35 to 85:15 as the molar ratio of $Li_2S:P_2S_5$, and more preferably 68:32 to 75:25. Setting the ratio of $Li_2S$ and $P_2S$ in this range makes it possible to make the lithium ionic conductivity high. In detail, it is possible to make the lithium ionic conductivity preferably $1 \times 10^{-4}$ S/cm or more, and more preferably $1 \times 10^{-3}$ S/cm or more. The upper limit is not particularly limited; however, $1 \times 10^{-1}$ S/cm or less is practical.

Specific examples of the compound include a compound which is formed using a raw material composition which contains $Li_2S$ and a sulfide of elements of group XIII to group XV. In detail, $Li_2S$—$P_2S_5$, $Li_2S$—LiI—$P_2S_5$, $Li_2S$—LiI—$Li_2O$—$P_2S$, $Li_2S$—LiBr—$P_2S$, $Li_2S$—$Li_2O$—$P_2S_3$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S$, $Li_2S$—$GeS_2$—$Sb_2S_5$, $Li_2S$—$GeS_2$—$Al_2S_3$, $Li_2S$—$SiS_2$, Li$_2$S-A$_2$S$_3$, $Li_2S$—$SiS_2$—$Al_2S_3$, $Li_2S$—$SiS_2$—$P_2S_5$, $Li_2S$—$SiS_2$—$P_2S$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Among these, a crystalline and/or non-crystalline raw material composition consisting of $Li_2S$—$P_2S_5$, $Li_2S$—$GeS_2$—$Ga_2S_3$, $Li_2S$—LiI—$P_2S_5$, $Li_2S$—LiI—$Li_2O$—$P_2S_5$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—$Li_3PO_4$—$P_2S$, $Li_2S$—$GeS_2$—$P_2S_5$, or $Li_{10}GeP_2S_{12}$ is preferable due to having high lithium ionic conductivity. Examples of a method for synthesizing a sulfide solid electrolyte material using the raw material composition include a non-crystallizing method. Examples of non-crystallizing methods include a mechanical milling method and a melt quenching method and, among these, a mechanical milling method is preferable. This is because treatment at a normal temperature is possible and it is possible to simplify the manufacturing steps.

The sulfide solid electrolyte is more preferably represented by Formula (2) below.

$$Li_1P_mS_n \qquad \text{Formula (2)}$$

In Formula (2), 1 to n indicate the compositional ratio of each element and l:m:n satisfies 2 to 4:1:3 to 10.

(ii) Oxide-Based Inorganic Solid Electrolyte

An oxide-based solid electrolyte preferably contains oxygen (O), has ionic conductivity for metal which belongs to group I or group II in the periodic table, and has an electrical insulation property.

Specific examples of the compound include $Li_{xa}La_{ya}TiO_3$ [xa=0.3 to 0.7, ya=0.3 to 0.7](LLT), $Li_{xb}La_{yb}Zr_{zb}M^{bb}{}_{mb}O_{nb}$ ($M^{bb}$ is an element of at least one or more elements of Al, Mg, Ca, Sr, V, Nb, Ta, Ti, Ge, In, or Sn, xb satisfies 5≤xb≤10, yb satisfies 1≤yb≤4, zb satisfies 1≤zb≤4, mb satisfies 0≤mb≤2, and nb satisfies 5≤nb≤20), $Li_{xc}B_{yc}M^{Cc}{}_{zc}O_{nc}$ ($M^{Cc}$ is an element of at least one or more elements of C, S, Al, Si, Ga, Ge, In, or Sn, xc satisfies 0≤xc≤5, yc satisfies 0≤yc≤1, zc satisfies 0≤zc≤1, and nc satisfies 0≤nc≤6), $Li_{xd}$(Al, Ga)$_{yd}$(Ti, Ge)$_{yd}Si_{ad}P_{md}O_{nd}$ (here, 1≤xd≤3, 0≤yd≤1, 0≤zd≤2, 0≤ad≤1, 1≤md≤7, 3≤nd≤13), $Li_{(3-2xe)}M^{ee}{}_{xe}D^{ee}O$ (xe represents a number of 0 or more and 0.1 or less, $M^{cc}$ represents a divalent metallic atom. $D^{cc}$ represents a halogen atom or a combination of two or more types of halogen atoms), $Li_{xf}Si_{yf}O_{zf}$ (1≤xf≤5, 0<yf≤3, 1≤zf≤10), $Li_{xg}Si_{yg}O_{zg}$ (1≤xg≤3, 0<yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w is w<1), $Li_{3.5}Zn_{0.25}GeO_4$ which has a lithium super ionic conductor (LISICON) type crystal structure, $La_{0.55}Li_{0.35}TiO_3$ which has a perovskite type crystal structure, $LiTi_2P_3O_{12}$ which has a natrium super ionic conductor (NASICON) type crystal structure, $Li_{1+xh+yh}$(Al, Ga)$_{xh}$(Ti, Ge)$_{2-xh}Si_{yh}P_{3-yh}O_{12}$ (here, 0≤xh≤1, 0≤yh≤1), $Li_7La_3Zr_2O_{12}$ which has a garnet type crystal structure, and the like. In addition, a phosphorus compound which includes Li, P, and O is also desirable. Examples thereof include lithium phosphate ($Li_3PO_4$), LiPON where some of the oxygen of lithium phosphate is substituted with nitrogen, LiPOD$^1$ (D$^1$ is at least one element which is selected from Ti, V, Cr, Mn, Fe, Co, Ni, Cu, Zr, Nb, Mo, Ru, Ag, Ta, W, Pt, Au, or the like), or the like. In addition, it is also possible to preferably use LiA$^1$ON (A$^1$ is at least one element which is selected from Si, B, Ge, Al, C, Ga, or the like) and the like.

Among these, $Li_{xa}La_{ya}TiO_3$ [xa=0.3 to 0.7, ya=0.3 to 0.7] (LLT), $Li_{xb}La_{yb}Zr_{zb}M^{bb}O_{nb}$ ($M^{bb}$ is an element of at least one or more elements of Al, Mg, Ca, Sr, V, Nb, Ta, Ti, Ge, In, or Sn, xb satisfies 5≤xb≤10, yb satisfies 1≤yb≤4, zb satisfies 1≤zb≤4, mb satisfies 0≤mb≤2, and nb satisfies 5≤nb≤20), $Li_7La_3Zr_2O_{12}$ (LLZ), $Li_3BO_3$, $Li_3BO_3$—$Li_2SO_4$, $Li_{xd}$(Al, Ga)$_{yd}$(Ti, Ge)$_{zd}Si_{ad}P_{md}O_{nd}$ (here, 1≤xd≤3, 0≤yd≤1, 0≤zd≤2, 0≤ad≤1, 1≤md≤7, and 3≤nd≤13) are preferable.

These may be used individually or may be used in a combination of two or more types.

The ionic conductivity of the lithium ionic conductive oxide-based inorganic solid electrolyte is preferably $1\times10^{-6}$ S/cm or more, more preferably $1\times10^{-5}$ S/cm or more, and particularly preferably $5\times10^{-5}$ S/cm or more.

In the present invention, the oxide-based inorganic solid electrolyte is preferably used among the above. Since the oxide-based inorganic solid electrolyte has a higher hardness in general, increases in the interface resistance easily occur in an all-solid secondary battery and, by applying the present invention, the effect is correspondingly more remarkable. At this time, since the oxide-based inorganic solid electrolyte has oxygen atoms in the structure, a binder of which the unity therewith is high is preferably used. From this viewpoint, a polymer compound which forms the binder which will be described below preferably has an acidic group, a hydroxy group, a cyano group, an amino group ($NR^N{}_2$), or an amide group ($CONR^N{}_2$) in the side chain section thereof and more preferably includes an acidic group or a hydroxy group. Due to this, a binder is more firmly adhered to inorganic solid electrolyte particles and more favorable performances are obtained in the decrease of interface resistance and the like. $R^N$ is a hydrogen atom, an alkyl group with 1 to 6 carbon atoms, or an aryl group with 6 to 10 carbon atoms.

The inorganic solid electrolyte described above may be used as one type individually or may be used in a combination of two or more types.

The average particle size (diameter) of the inorganic solid electrolyte is not particularly limited; however, 0.01 μm or more is preferable, and 0.1 μm or more is more preferable. The upper limit is preferably 100 μm or less, and more preferably 50 μm or less.

When considering both battery performance and the reduction and maintenance effects on the interface resistance, the concentration of the inorganic solid electrolyte in the solid electrolyte composition is preferably 50 mass % or more in 100 mass % of the solid component, more preferably 70 mass % or more, and particularly preferably 90 mass % or more. From the same viewpoint, the upper limit is preferably 99.9 mass % or less, more preferably 99.5 mass % or less, and particularly preferably 99 mass % or less. However, when used with the cathode active material or anode active material which will be described below, the total is preferably within the concentration ranges described above.

(Binder)

Figure 2:
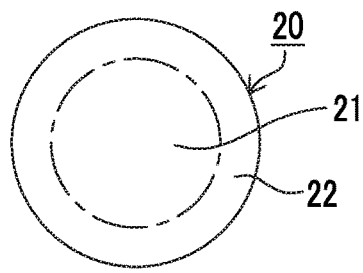
FIG. 2 is a cross-sectional diagram which schematically shows a cross-section of a core-shell particle.

The binder of the present invention is formed of core-shell particles. When the core-shell particle is schematically shown, the cross-section thereof is as shown in FIG. 2. In FIG. 2, a particle 20 is formed such that a shell 22 covers the periphery of a core 21. The ratio of the core and the shell is not particularly limited; however, the shell is preferably 5 parts by mass or more with respect to 100 parts by mass of the core, more preferably 10 parts by mass or more, and particularly preferably 20 parts by mass or more. The upper limit is preferably 200 parts by mass or less, more preferably 150 parts by mass or less, and particularly preferably 100 parts by mass or less. Here, the present invention is not to be interpreted as being limited by the form in FIG. 2. For example, in the present invention, the particle may be a particle which is laminated with three or more layers using three or more monomer components. At this time, the innermost layer is a core section and the entirety of the layer on the outside thereof is a shell section. When the shell section is formed of a plurality of layers, the Tg of the shell section is calculated as a weight average based on the mass of each layer.

Regarding the core-shell particle according to the present invention, the difference (ΔTg) between the glass transition temperatures of the polymer compounds which form the core section and the shell section thereof is 50° C. or more. Any one of the glass transition temperature of the polymer compound which forms the core section described above and the glass transition temperature of the polymer compound which forms the shell section may be higher; however, the glass transition temperature of the polymer compound of the core section is preferably higher. The temperature difference (ΔTg) between the core section and the shell section described above is preferably 70° C. or more and particularly preferably 90° C. or more. There is no upper limit on the glass transition temperature difference (ΔTg); however, 250° C. or less is practical.

The glass transition temperature (Tg (C)) of the polymer compound of the core section is preferably 40° C. or more when set to be higher than the shell section, more preferably 60° C. or more, even more preferably 70° C. or more, and particularly preferably 80° C. or more. In a case where Tg is observed, the upper limit of the Tg (C) is preferably 300° C. or less, and more preferably 250° C. or less. When the glass transition temperature (Tg (C)) of the polymer compound of the core section is set to be lower than the shell section, the glass transition temperature (Tg (C)) of the polymer compound of the core section is preferably −150° C. or more, and more preferably −120° C. or more. The upper limit is preferably 30° C. or less, and more preferably 20° C. or less.

The glass transition temperature (Tg (S)) of the polymer compound of the shell section is preferably −150° C. or more when set to be lower than the core section and more preferably −120° C. or more. The upper limit is preferably 30° C. or less, and more preferably 20° C. or less. When the glass transition temperature (Tg (S)) of the polymer compound of the shell section is set to be higher than the core section, the glass transition temperature (Tg (S)) of the polymer compound of the shell section is preferably 40° C. or more, more preferably 60° C. or more, even more preferably 70° C. or more, and particularly preferably 80° C. or more. In a case where Tg is observed, the upper limit of Tg (S) is preferably 300° C. or less, and more preferably 250° C. or less.

Here, in a case where Tg is not observed in a polymer which configures the core section or the shell section, there is no limit on the difference of Tg and this is also a preferable aspect. For example, there are cases where Tg disappears when the polymer is cross-linked for rigidity; however, examples of a preferable aspect also include such a case. Setting Tg of the core-shell particle in these ranges makes it possible to realize favorable binding properties and flexibility in the electrolyte layer or the like in an all-solid secondary battery.

The polymer compound which forms the core section described above and the polymer compound which forms the shell section may be selected by appropriately measuring Tg of the polymer compound. When using a polymer which has a structure which is represented by Formula (1) or (2) which will be described next and a structure which is derived from a macromonomer, examples thereof include molecular design such as increasing the ratio of a monomer which forms a polymer with high Tg during polymerization or adding cross-linking components in order to set Tg to be high. On the other hand, examples thereof include molecular design such as increasing the ratio of a monomer which forms a polymer with low Tg during polymerization in order to set Tg to be low. As monomers of which Tg is high, methyl methacrylate (Tg=approximately 105° C. during polymerization) and acrylonitrile (Tg=approximately 105° C. during polymerization) may be used. Examples of a monomer of which Tg is low include 2-ethyl hexyl acrylate (Tg=approximately −70° C. during polymerization).

The binder described above preferably consists of a polymer compound which includes a structure unit which is represented by Formula (1) or (2) below.

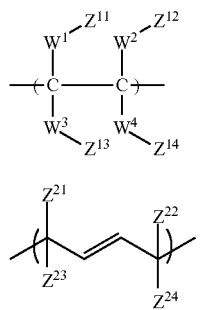

In the formula, $W^1$ to $W^4$ each independently represent a single bond or a divalent linking group. $Z^{11}$ to $Z^{14}$ and $Z^{21}$ to $Z^{24}$ each represent a hydrogen atom or a substituent. Here, at least one of $Z^{11}$, ..., or $Z^{14}$ and at least one of $Z^{21}$, ..., or $Z^{24}$ are a substituent. $W^1$ to $W^4$, $Z^{11}$ to $Z^{14}$, and $Z^{21}$ to $Z^{24}$ may bond with each other to form a cyclic structure. $W^1$ and $W^2$, $W^1$ and $Z^{12}$, $W^2$ and $Z^{11}$, $W^3$ and $W^4$, $W^3$ and $Z^{14}$, and $W^4$ and $Z^{13}$ may each bond with each other to form a cyclic structure. Examples of the formed cyclic structures include the examples in Formulas (1a) and (1b) below when shown with an ethylene chain which is a main chain.

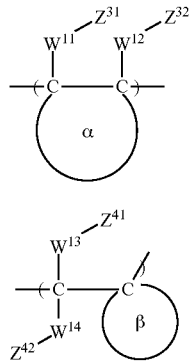

Rings α and β each independently indicate a monocyclic or polycyclic aliphatic cyclic functional group or a cyclic functional group which includes a carbonyl group. In the formulas, $W^{11}$ to $W^{14}$ each independently represent a single bond or a divalent linking group. $Z^{31}$ and $Z^{32}$ and $Z^{41}$ and $Z^{42}$ each independently represent a hydrogen atom or an arbitrary substituent.

Examples of the rings α and β include a 3-membered ring to 8-membered ring and among these, a 5-membered ring or 6-membered ring is preferable. In detail, examples thereof include a cycloheptane ring, a cyclohexane ring, a norbornane ring, a ring which has a carbonyl group and an oxygen atom (for example, a succinic anhydride ring), or a ring which includes a carbonyl group and an imino group ($NR^N$) (for example, a succinimide ring).

Any of the cyclic groups exemplified above may further have an arbitrary substituent T.

$Z^{11}$ to $Z^{14}$, $Z^{21}$ to $Z^{24}$, $Z^{31}$, $Z^{32}$, $Z^{41}$, and $Z^{42}$ may be linked with another polymer chain which is represented by Formula (1) or (2). In other words, in the structure, the main chain of Formula (1) or (2) is cross-linked via $Z^{11}$ to $Z^{14}$, $Z^{21}$ to $Z^{24}$, $Z^{31}$, $Z^{32}$, $Z^{41}$, and $Z^{42}$.

$W^1$ to $W^4$ and $W^{11}$ to $W^{14}$ $W^1$ to $W^4$ and $W^{11}$ to $W^{14}$ are each independently a single bond or an arbitrary linking group. Examples of the linking group include an alkylene group with 1 to 30 carbon atoms (preferably with 1 to 12 carbon atoms, more preferably with 1 to 6 carbon atoms), a cycloalkylene group with 3 to 12 carbon atoms (preferably with 3 to 6 carbon atoms), an arylene group with 6 to 24 carbon atoms (preferably 6 to 10 carbon atoms), a heteroarylene group with 2 to 12 carbon atoms (preferably with 3 to 6 carbon atoms), an oxy group (—O—), a sulfide group (—S—), a phosphinidene group (—$PR^P$—: $R^P$ is a hydrogen atom or an alkyl group with 1 to 6 carbon atoms), a silylene group (—SiRR'—: R and R' are a hydrogen atom or an alkyl group with 1 to 6 carbon atoms), a carbonyl group, an imino group (—$NR^N$—: $R^N$ is a hydrogen atom, an alkyl group with 1 to 6 carbon atoms, or an aryl group with 6 to 10 carbon atoms), or a group according to a combination thereof, and the like. The linking groups described above may have an arbitrary substituent. Examples of the arbitrary substituent include the examples of the substituent of $Z^{11}$ and examples thereof include an alkyl group, a halogen atom, and the like.

$W^1$ to $W^3$ are preferably a single bond or a group which forms a cyclic structure which is represented by Formula (1a) or (1b) described above.

Among these, $W^4$ is preferably an oxy group, a sulfide group, a carbonyl group, a thiocarbonyl group, an imino group, an alkylene group (preferably with 1 to 12 carbon atoms, more preferably with 1 to 6 carbon atoms, and particularly preferably 1 to 3 carbon atoms), an alkenylene group (preferably with 2 to 12 carbon atoms, more preferably with 2 to 6 carbon atoms, and particularly preferably with 2 or 3 carbon atoms), a single bond, or a linking group according to the combination thereof. In more detail, a single bond, an amide group ($CONR^N$), an oxy group, a carbonyl group, a carbonyloxy group, and a group where —$R^C$—, —($R^C$—O)nc-, or —($R^C$—COO)nc- is combined therewith are preferable. Here, $R^C$ is an alkylene group with 1 to 12 carbon atoms and preferably an alkylene group with 1 to 6 carbon atoms. nc is an integer of 1 to 30. The alkylene group and the alkenylene group here may have a halogen atom.

$Z^{11}$ to $Z^{14}$, $Z^{21}$ to $Z^{24}$, $Z^{31}$, $Z^{32}$, $Z^{41}$, and $Z^{42}$ Examples of $Z^{11}$ to $Z^{14}$, $Z^{21}$ to $Z^{24}$, $Z^{31}$, $Z^{32}$, $Z^{41}$, and $Z^{42}$ include the following.

A hydrogen atom, an alkyl group (preferably an alkyl group with 1 to 30 carbon atoms, for example, methyl, ethyl, isopropyl, t-butyl, pentyl, hexyl, 2-ethylhexyl, heptyl, 1-ethylpentyl, decyl, dodecyl, hexadecane, octadecane, benzyl, 2-ethoxyethyl, 1-carboxymethyl, and the like), an alkenyl group (preferably an alkenyl group with 2 to 20 carbon atoms, for example, vinyl, allyl, oleyl, and the like), an alkynyl group (preferably an alkynyl group with 2 to 20 carbon atoms, for example, ethynyl, butadiynyl, phenyl ethynyl, and the like), a cycloalkyl group (preferably a cycloalkyl group with 3 to 20 carbon atoms, for example, cyclopropyl, cyclopentyl, cyclohexyl, 4-methyl cyclohexyl, and the like), an aryl group (preferably an aryl group with 6 to 26 carbon atoms, for example, phenyl, 1-naphthyl, 4-methoxyphenyl, 2-chlorophenyl, 3-methylphenyl, and the like), a heterocyclic group (preferably a heterocyclic group with 2 to 20 carbon atoms, preferably a heterocyclic group with 2 to 20 carbon atoms of a 5-membered or 6-membered ring which has at least one oxygen atom, sulfur atom, or nitrogen atom, for example, 2-pyridyl, 4-pyridyl, 2-imidazolyl, 2-benzimidazolyl, 2-thiazolyl, 2-oxazolyl, and the like), an alkoxy group (preferably an alkoxy group with 1 to 20 carbon atoms, for example, methoxy, ethoxy, isopropyloxy, benzyloxy, and the like), an aryloxy group (preferably an aryloxy group with 6 to 26 carbon atoms, for example, phenoxy, 1-naphthyloxy, 3-methylphenoxy, 4-methoxyphenoxy, and the like), an alkoxycarbonyl group (preferably an alkoxycarbonyl group with 2 to 20 carbon atoms, for example, ethoxycarbonyl, 2-ethylhexyloxy carbonyl, and the like), an amino group (preferably including an amino group with 0 to 20 carbon atoms, an alkylamino group, and an arylamino group, for example, amino, N,N-dimethylamino, N,N-diethylamino, N-ethylamino, anilino, and the like), a sulfamoyl group (preferably a sulfamoyl group with 0 to 20 carbon atoms, for example, N,N-dimethylsulfamoyl, N-phenylsulfamoyl, and the like), an acyloxy group (preferably an acyloxy group with 1 to 20 carbon atoms, for example, acetyloxy, benzoyloxy, and the like), a carbamoyl group (preferably a carbamoyl group with 1 to 20 carbon atoms, for example, N,N-dimethylcarbamoyl, N-phenylcarbamoyl, and the like), an acylamino group (preferably an acylamino group with 1 to 20 carbon atoms, for example, acetylamino, benzoylamino, and the like), a hydroxy group, a carboxyl group, a cyano group, a phosphoric acid group, a sulfonic acid group, a phosphonic acid group, an oxetane group, an oxirane group, a tetrahydrofuryl group, a trifluoromethyl group, a difluoromethyl group, and a halogen atom (for example, a fluorine atom, a chlorine atom, a bromine atom, an iodine atom, and the like).

$Z^{11}$, $Z^{12}$, $Z^{13}$, $Z^{21}$, $Z^{22}$, $Z^2$, $Z^{31}$, $Z^{32}$, $Z^{41}$, and $Z^{42}$ are each independently preferably a hydrogen atom, a halogen atom (for example, a fluorine atom), an alkyl group (preferably with 1 to 12 carbon atoms, more preferably with 1 to 6 carbon atoms, and particularly preferably with 1 to 3 carbon atoms), an alkenyl group (preferably with 2 to 12 carbon atoms, more preferably with 2 to 6 carbon atoms, and particularly preferably with 2 or 3 carbon atoms), or a cyano group. The alkyl group and the alkenyl group here may have a halogen atom.

$Z^{14}$ and $Z^{24}$ are each independently preferably a hydrogen atom, a hydroxy group, an alkyl group (preferably with 1 to 24 carbon atoms, more preferably with 1 to 18 carbon atoms, and particularly preferably with 1 to 12 carbon atoms), an alkenyl group (preferably with 2 to 12 carbon atoms and more preferably with 2 to 6 carbon atoms), an aryl group (preferably with 6 to 22 carbon atoms, more preferably with 6 to 14 carbon atoms, and even more preferably with 6 to 10 carbon atoms), an alkoxy group (preferably with 1 to 12 carbon atoms, more preferably with 1 to 6 carbon atoms, and particularly preferably with 1 to 3 carbon atoms), an aryloxy group (preferably with 6 to 22 carbon atoms, more preferably with 6 to 14 carbon atoms, and even more preferably with 6 to 10 carbon atoms), a cyano group, a phosphoric acid group, a sulfonic acid group, a phosphonic acid group, an amino group ($NR^N_2$), an oxetane group, an oxirane group, a tetrahydrofuryl group, or linked to the polymer chain of Formula (1) or (2) via these groups or not via these groups. The alkyl group and the alkenyl group may be linear or branched and may be cyclic. The groups described above may be substituted with a halogen atom (fluorine, bromine, chlorine, and the like), a carboxyl group, a hydroxy group, and the like. Examples of a group which has a halogen atom include a fluoroalkyl group (for example, a trifluoromethyl group).

As a high Tg polymer component, Formula (1) is preferable. $W^1$ is preferably a single bond. $W^2$ is preferably a single bond or a structure which has a cyclic structure with $W^4$ as in Formula (1b). $W^3$ is preferably a single bond or a structure which has a cyclic structure with $W^4$ as in Formula (1a). $W^4$ is preferably an oxy group, a carbonyl group, an imino group, an alkylene group which may have a halogen atom, a single bond, or a linking group according to a combination thereof. $Z^{11}$ to $Z^{14}$ are preferably a hydrogen atom, methyl, an aryl group (preferably an aryl group with 6 to 26 carbon atoms (for example, phenyl, 1-naphthyl, 4-methoxyphenyl, 2-chlorophenyl, 3-methylphenyl, and the like)), a carboxyl group, a cyano group, a trifluoromethyl group, a difluoromethyl group, and a halogen atom (for example, a fluorine atom, a chlorine atom, a bromine atom, an iodine atom, and the like). Even in a case of not being within the favorable ranges described above, in a case of including a monomer which has two or more reactive double bond sites, the above is preferable as a high Tg polymer component.

As a low Tg polymer component, Formula (1) or Formula (2) is preferable, $W^1$ to $W^3$ are preferably a single bond, and $W^4$ is, among these, preferably an oxy group, a carbonyl group, an imino group, an alkylene group which may have a halogen atom, a single bond, or a linking group according to a combination thereof. In more detail, a single bond, an oxy group, a carbonyl group, a carbonyloxy group, an amide group, and a group where —$R^C$—, —($R^C$—O)nc-, or —($R^C$—COO)nc- is combined therewith are preferable. $Z^{11}$ to $Z^{13}$ are preferably a hydrogen atom, a hydroxy group, an alkyl group (preferably with 1 to 24 carbon atoms, more preferably with 1 to 18 carbon atoms, and particularly preferably with 1 to 12 carbon atoms) which may have a halogen atom, an alkoxy group (preferably with 1 to 12 carbon atoms, more preferably with 1 to 6 carbon atoms, and particularly preferably with 1 to 3 carbon atoms) which may have a halogen atom, a cyano group, a phosphoric acid, a sulfonic acid group, an amino group ($NR^N_2$), an oxetane group, a trifluoromethyl group, a carboxyl group, a difluoromethyl group, or a halogen atom (for example, a fluorine atom, a chlorine atom, a bromine atom, an iodine atom, and the like).

The binder preferably has the group (b) of functional groups below and more preferably has the group (c) of functional groups.

Group (b) of Functional Groups

Substituents

A carboxyl group, a sulfonic acid group, a phosphoric acid group, a phosphonic acid group, a hydroxy group, a cyano group, and an amino group ($NR^N_2$)

Linking Groups

A carbonyl group (—CO—), an imino group (—$NR^N$—), an oxy group (—O—), and a sulfide group (—S—)

Group (c) of Functional Groups

A Carboxyl Group, a Sulfonic Acid Group, a Phosphoric Group, and a Hydroxy Group In addition, the binder preferably includes a repeating unit which is derived from a monomer which is selected from a (meth)acrylic acid monomer, a (meth)acrylic acid ester monomer, and a (meth)acrylonitrile monomer.

The structure section described here may be incorporated in the structure unit of Formula (1) or (2) or may be incorporated in the macromonomer (X); however, it is preferably incorporated in Formula (1) or (2).
Specific Examples of Monomers
A-1
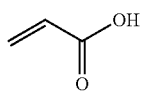
A-2
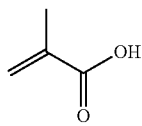
A-3
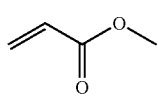
A-4
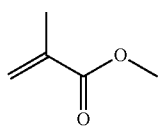
A-5
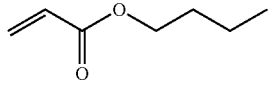
A-6
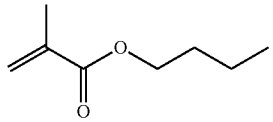
A-7
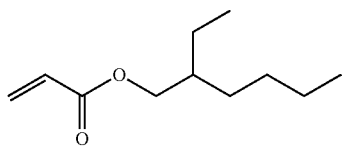
A-8
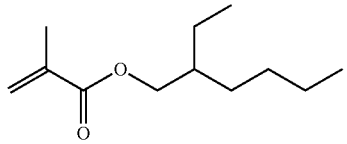
A-9
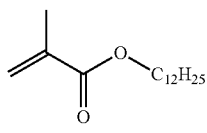
A-10
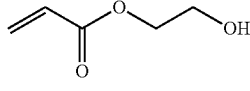
A-11
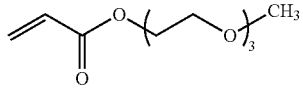
-continued
A-12
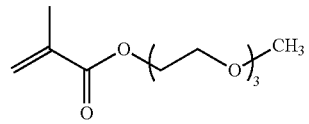
A-13
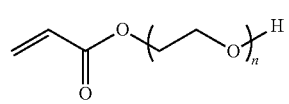
A-14
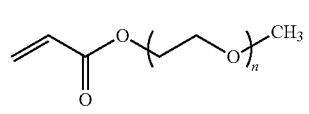
A-15
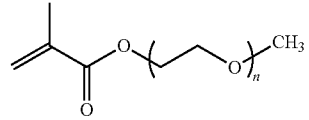
A-16
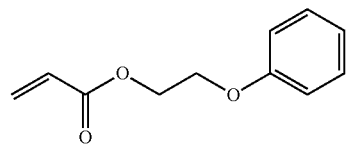
A-17
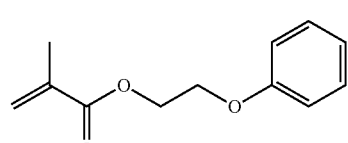
A-18
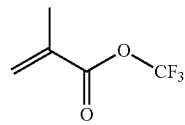
A-19
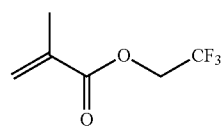
A-20
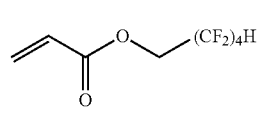
A-21
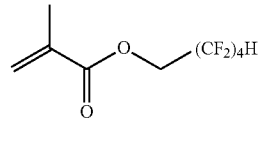
A-22
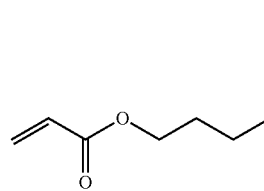

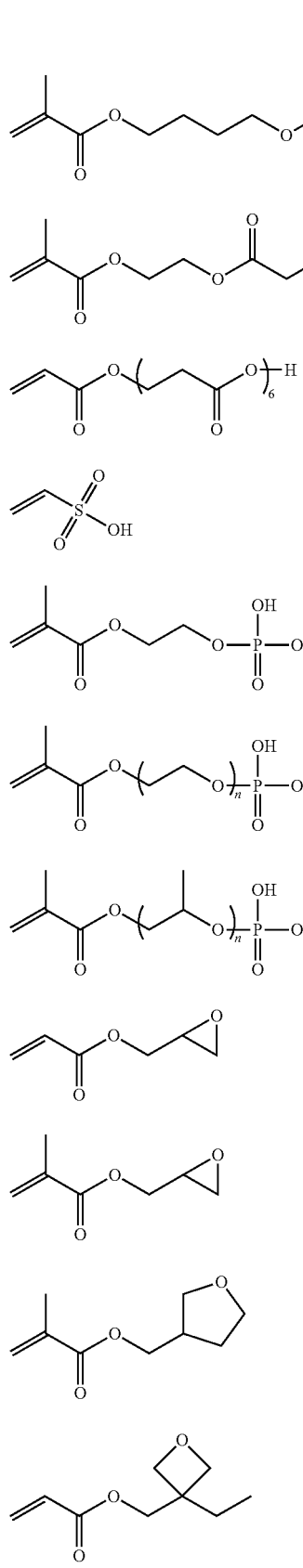
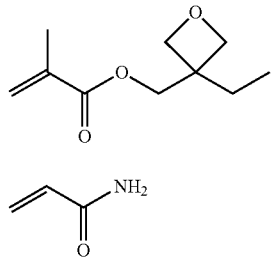
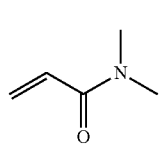
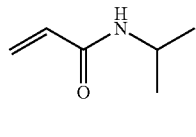
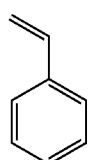
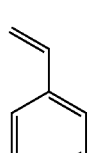

A-48
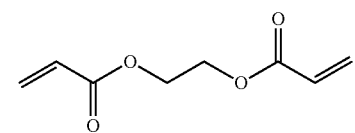
A-49
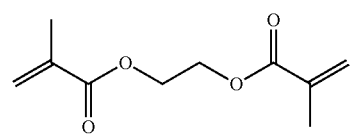
A-50
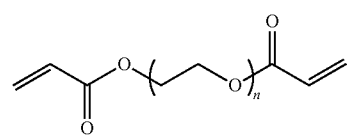
A-51
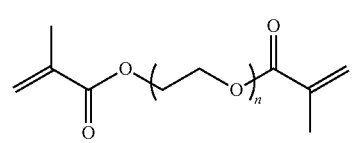
A-52
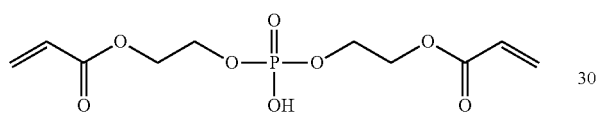
A-53
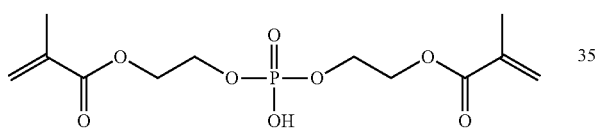
A-54
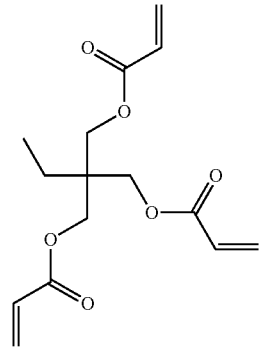
A-55
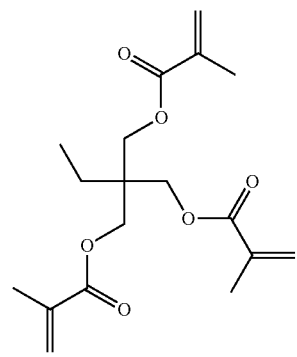
A-56
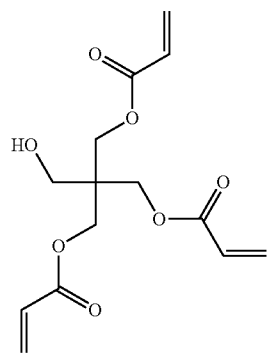
A-57
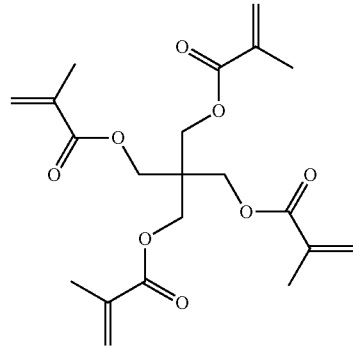
A-58
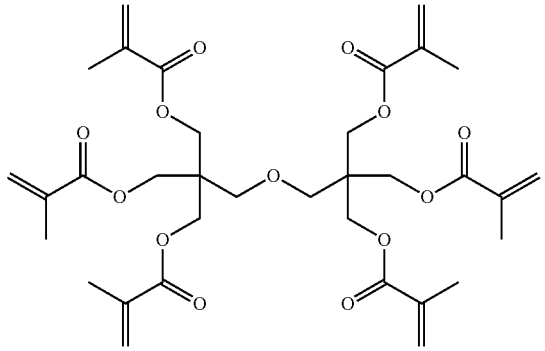
A-59
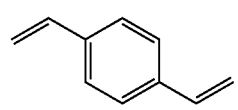
A-60
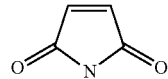
A-61
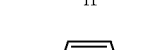
A-62
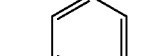

-continued

A-63 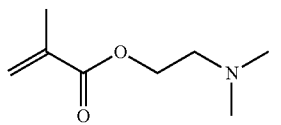

A-64 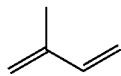

A-65 

A-66 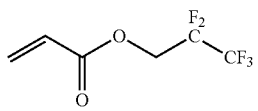

A-67 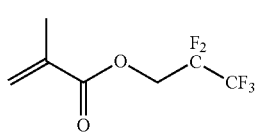

A-68 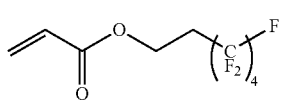

A-69 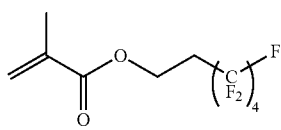

A-70 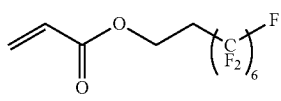

A-71 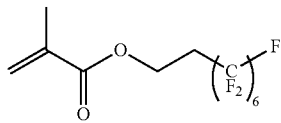

A-72 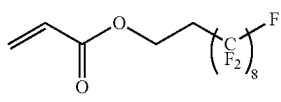

A-73 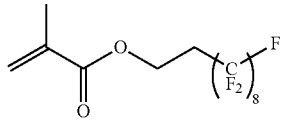

A-74 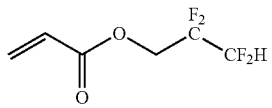

A-75 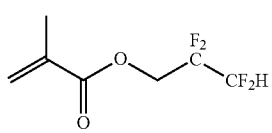

-continued

A-76 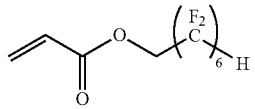

A-77 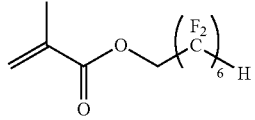

A-78 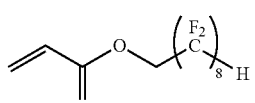

A-79 

A-80 

A-81 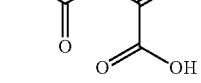

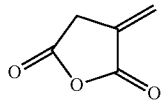

n is an integer of 1 to 1,000.

Side Chain Components (Macromonomer (X))

The weight-average molecular weight of the macromonomer is preferably 1,000 or more, more preferably 2,000 or more, and particularly preferably 3,000 or more. The upper limit is preferably 500,000 or less, more preferably 100,000 or less, and particularly preferably 30,000 or less. The polymer which forms the binder particles described above having a side chain which has a molecular weight in the range described above makes it possible to more favorably carry out even dispersion in an organic solvent and to carry out the coating after mixing with inorganic solid electrolyte particles.

Here, as the effect of the solid electrolyte composition according to the embodiment which uses the macromonomer, it is understood that the side chain components described above in the binder polymer have a function which improves dispersibility in a solvent. Since the binder is favorably dispersed in particle form in a solvent due to this, it is possible carry out adhesion without coating part of the surface or the entire surface with the inorganic solid electrolyte. As a result, it is considered that, since equal intervals are maintained between the binder particles and the electrical connection between the particles is not shielded, it is possible to suppress an increase in the interface resistance between solid particles, between current collectors, and the like. Furthermore, by the binder polymer having a side chain, not only are the binder particles attached to inorganic solid electrolyte particles, but it is also possible to expect an effect in which the side chain is entangled. It is considered that, due to this, it is possible to achieve both suppression of interface resistance and improvement in the adhering property due to the inorganic solid electrolyte. Furthermore, due to the good dispersibility, in comparison with in-water emulsion polymerization or the like, it is possible to omit a step of transferring to an organic solvent and, moreover, it is also possible to use a solvent with a low boiling point as the dispersing medium. Here, it is possible to identify the molecular weight of the side chain component (X) by measuring the molecular weight of a polymerizable compound (a macromonomer) which is incorporated when synthesizing the polymer which forms the binder particles.

—Measurement of Molecular Weight—

In the present invention, unless otherwise stated, the molecular weight of the polymer refers to a weight-average molecular weight and the weight-average molecular weight of standard polystyrene conversion is measured by gel permeation chromatography (GPC). A value which is measured using the method of condition 1 or condition 2 (priority) below as the measurement method is set as a base. Here, depending on the polymer type, a suitable eluent may be appropriately selected and used.

(Condition 1)
Column: TOSHO TSKgel Super AWM-H is connected
Carrier: 10 mM LiBr/N-methylpyrrolidone
(Condition 2)
Column: Column to which TOSOH TSKgel Super HZM-H, TOSOH TSKgel Super HZ4000, or TOSOH TSKgel Super HZ2000 is connected is used
Carrier: Tetrahydrofuran The SP value of the macromonomer (X) is preferably 10 or less, and more preferably 9.5 or less. There is no particular lower limit; however, 5 or more is practical.

—Definition of SP Value—

Unless otherwise stated, the SP value in the present specification is obtained by the Hoy method (H. L. Hoy Journal of Painting, 1970, Vol. 42, 76 to 118). In addition, the SP value is shown without a unit; however, the unit is $cal^{1/2}$ $cm^{-3/2}$. Here, the SP value of the side chain component (X) is substantially the same as the SP value of the raw material monomer which forms the side chain described above and may be evaluated accordingly.

The SP value is an index which indicates characteristics for dispersal in an organic solvent. Here, by setting the side chain component to be a specific molecular weight or more, preferably the SP value described above or more, it is possible to improve the binding properties with the inorganic solid electrolyte to increase the compatibility with a solvent and carry out stable dispersion, which is preferable.

The main chain of the side chain component of the macromonomer (X) described above is not particularly limited and it is possible to apply general polymer components thereto. The macromonomer (X) preferably has a polymerizable unsaturated bond. For example, it is possible to use a macromonomer which has a vinyl group which may have a substituent, an acryloyl group which may have a substituent, a vinylcarbonyl imino group which may have a substituent, a vinylphenyl group which may have a substituent, and the like. In the present invention, among these, it is preferable to have a (meth)acryloyl group.

The macromonomer (X) described above preferably includes a repeating unit which is derived from a monomer which is selected from a (meth)acrylic acid monomer, a (meth)acrylic acid ester monomer, and a (meth)acrylonitrile. In addition, the macromonomer (X) described above preferably includes a polymerizable double bond and a linear hydrocarbon structure unit S with 6 or more carbon atoms (preferably an alkylene group with 6 or more and 30 or less carbon atoms and more preferably an alkylene group with 8 or more and 24 or less carbon atoms). In this manner, by the macromonomer which forms the side chain having the linear hydrocarbon structure unit S, it is possible to expect an effect in which the compatibility with a solvent is increased and the dispersion stability improves.

The macromonomer (X) described above preferably has a site which is represented by Formula (b-11) below.

(b-11)

$R^{b11}$ represents a hydrogen atom, a hydroxy group, a cyano group, a halogen atom, an alkyl group (preferably with 1 to 24 carbon atoms, more preferably with 1 to 12 carbon atoms, and particularly preferably with 1 to 6 carbon atoms), an alkenyl group (preferably with 2 to 24 carbon atoms, more preferably with 2 to 12 carbon atoms, and particularly preferably with 2 to 6 carbon atoms), an alkynyl group (preferably with 2 to 24 carbon atoms, more preferably with 2 to 12 carbon atoms, and particularly preferably with 2 to 6 carbon atoms), or an aryl group (preferably with 6 to 22 carbon atoms and more preferably with 6 to 14 carbon atoms). Among these, a hydrogen atom or an alkyl group is preferable, and a hydrogen atom or a methyl group is more preferable. * is a bonding section.

The macromonomer (X) described above preferably has a site which is represented by Formulas (b-12a) to (b-12c) below.

(b-12a)

(b-12b)

(b-12c)

$R^{b2}$ has the same meaning as $R^{b11}$. * is a bonding section. $R^N$ has the same meaning as the described above. An arbitrary substituent T may be substituted with a benzene ring in Formulas (b-12c), (b-13c), and (b-14c).

The macromonomer (X) described above is preferably a compound which is represented by Formulas (b-13a) to (b-13c) below or a compound which has a repeating unit which is represented by (b-14a) to (b-14c).

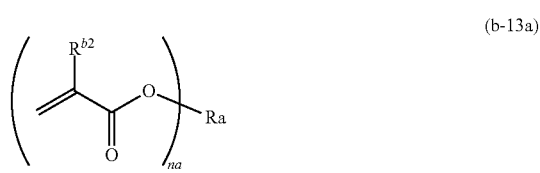

(b-13a)

-continued

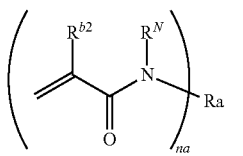 (b-13b)

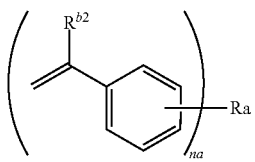 (b-13c)

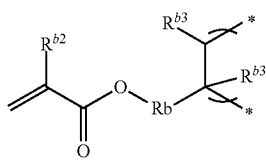 (b-14a)

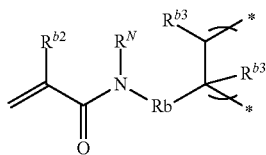 (b-14b)

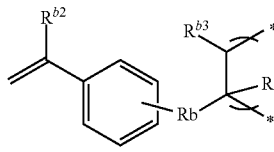 (b-14c)

$R^{b3}$ has the same meaning as $R^{b11}$.

$n_a$ is not particularly limited, but is preferably an integer of 1 to 6 and more preferably 1 or 2.

Ra represents a substituent (preferably an organic group) when na is 1 and a linking group when $n_a$ is 2 or more.

Rb is a divalent linking group.

When Ra and Rb are linking groups, the linking group is preferably an alkane linking group (an alkylene group in a case of being divalent) with 1 to 30 carbon atoms, a cycloalkane linking group (a cycloalkylene group in a case of being divalent) with 3 to 12 carbon atoms, an aryl linking group (an arylene group in a case of being divalent) with 6 to 24 carbon atoms, a heteroaryl linking group (a heteroarylene group in a case of being divalent) with 3 to 12 carbon atoms, an oxy group (—O—), a sulfide group (—S—), a phosphinidene group (—PR—: R is a hydrogen atom or an alkyl group with 1 to 6 carbon atoms), a silylene group (—SiRR'—: R and R' are a hydrogen atom or an alkyl group with 1 to 6 carbon atoms), a carbonyl group, an imino group (—NR$^N$—: R$^N$ is a hydrogen atom, an alkyl group with 1 to 6 carbon atoms, or an aryl group with 6 to 10 carbon atoms), or a combination thereof, and the like. Among these, an alkane linking group (an alkylene group in a case of being divalent) with 1 to 30 carbon atoms, an aryl linking group (an arylene group in a case of being divalent) with 6 to 24 carbon atoms, an oxy group, a carbonyl group, or a combination thereof is preferable.

When Ra is a monovalent substituent, examples thereof include the examples of the substituent T which will be described below and, among these, an alkyl group, an alkenyl group, and an aryl group are preferable. At this time, the compound may have a linking group which is defined when the Ra is a linking group.

At this time, Ra and Rb more preferably each contain at least a linear hydrocarbon structure unit (preferably an alkylene group) with 1 to 30 carbon atoms, and more preferably includes the linear hydrocarbon structure unit S. In addition, the Ra and Rb may each have a carbon atom, an oxygen atom, and a hydrogen atom, the linking group may have a substituent, and examples thereof include the substituent T which will be described below.

The macromonomer (X) described above preferably has a repeating unit which is represented by Formula (b-15) below.

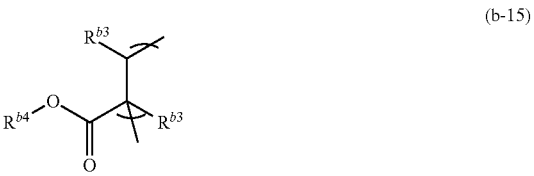 (b-15)

In the formula, $R^{b4}$ has the same meaning as the $Z^{11}$. A hydrogen atom, an alkyl group, and an aryl group are preferable.

Other than this, examples of the macromonomer (X) include an alkylene chain (for example, an ethylene chain) which may have a (meth)acrylate constitutional unit such as Formula (b-15) described above and a halogen atom (for example, a fluorine atom) other than the repeating unit which has a polymerizable group described above. At this time, an ether group (O) and the like may be interposed in the alkylene chain.

Alternatively, the macromonomer (X) is preferably a compound which is represented by Formulas (N-1) to (N-3) below.

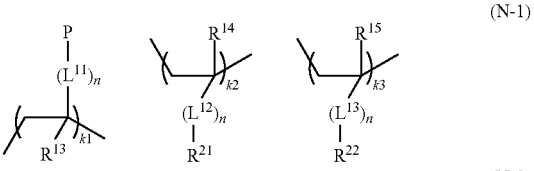 (N-1)

(N-2)

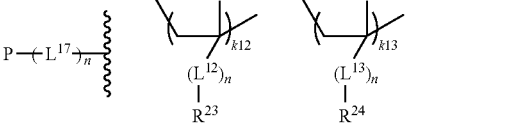 (N-3)

P is a polymerizable group. $L^{11}$ to $L^{17}$ are each independently a linking group. k1, k2, k3, k12, and k13 are a molar fraction. m is an integer of 1 to 200. n is 0 or 1. $R^{13}$ to $R^{15}$, $R^{21}$, and $R^{23}$ are each independently a polymerizable group or a substituent $R^1$ (a hydrogen atom, a hydroxy group, a cyano group, a halogen atom, a carboxyl group, an alkyl group (preferably with 1 to 24 carbon atoms, more preferably with 1 to 12 carbon atoms, and particularly preferably with 1 to 6 carbon atoms), an alkenyl group (preferably with 2 to 24 carbon atoms, more preferably with 2 to 12 carbon atoms, and particularly preferably with 2 to 6 carbon atoms), an alkynyl group (preferably with 2 to 24 carbon atoms, more preferably with 2 to 12 carbon atoms, and particularly preferably with 2 to 6 carbon atoms), or an aryl group (preferably with 6 to 22 carbon atoms and more preferably with 6 to 14 carbon atoms)). $R^{16}$ is a hydrogen atom or a substituent. q is 0 or 1. $R^{22}$ is a chain structure site with a higher molecular weight than that of $R^{21}$. $R^{24}$ is a hydrogen atom or a substituent.

P is a polymerizable group and is preferably Formulas (b-11), or (b-12a) to (b-12c). $L^{11}$ to $L^{17}$ are each independently a linking group L and preferably has the same meaning as the $L^1$ described above.

In the present specification, the structure at the left end which is represented using a wave line as described in Formula (N-3) represents at least one terminal structure of the main chain.

$L^{11}$ is preferably an alkylene group with 1 to 6 (preferably 1 to 3) carbon atoms, an arylene group with 6 to 24 (preferably 6 to 10) carbon atoms, an oxygen atom, a sulfur atom, an imino group ($NR^N$), a carbonyl group, a (poly)alkylene oxy group, a (poly)ester group, a (poly)amide group, or a group which is a combination thereof. $L^{11}$ may have the substituent T and, for example, may have a hydroxy group.

$L^{12}$ and $L^{13}$ are preferably an alkylene group with 1 to 6 (preferably 1 to 3) carbon atoms, an arylene group with 6 to 24 (preferably 6 to 10) carbon atoms, an oxygen atom, a sulfur atom, an imino group ($NR^N$), a carbonyl group, a (poly)alkylene oxy group, a (poly)ester group, a (poly)amide group, or a group which is a combination thereof.

$L^{14}$ is preferably an alkylene group with 1 to 24 (preferably 1 to 18) carbon atoms, an arylene group with 6 to 24 (preferably 6 to 10) carbon atoms, an oxygen atom, a sulfur atom, an imino group ($NR^N$), a carbonyl group, a (poly)alkylene oxy group, a (poly)ester group, a (poly)amide group, or a group which is a combination thereof and particularly preferably a (poly)alkylene oxy group (x is 1 to 4). The number of carbon atoms of the alkylene group at this time is preferably 1 to 12, more preferably 1 to 8, and particularly preferably 1 to 6. The alkylene group may have the substituent T and, for example, may have a hydroxy group.

$L^{15}$ is preferably an alkylene group among these. A comparatively long chain is preferable, 4 to 30 carbon atoms are preferable, 6 to 20 carbon atoms are more preferable, and 6 to 16 carbon atoms are particularly preferable. $L^{15}$ may have an arbitrary substituent. Examples of the arbitrary substituent include the substituent T and, more specifically, $L^{15}$ may have an arbitrary substituent such as a halogen atom, a hydroxy group, a carboxyl group, a thiol group, an acyl group, an acyloxy group, an alkoxy group, an aryloxy group, an aryloyl group, an aryloyloxy group, and an amino group.

$L^{16}$ is preferably a single bond (n=0).

$L^{17}$ is preferably an alkylene group with 1 to 6 (preferably 1 to 3) carbon atoms, an arylene group with 6 to 24 (preferably 6 to 10) carbon atoms, an oxygen atom, a sulfur atom, an imino group ($NR^N$), a carbonyl group, a (poly)alkylene oxy group, a (poly)ester group, a (poly)amide group, or a group which is a combination thereof. $L^{17}$ may have the substituent T and, for example, may have a hydroxy group.

n is 0 or 1.

$L^{11}$ to $L^{16}$ are preferably a linking group with 1 to 60 (preferably 1 to 30) atoms which is formed by an oxygen atom, a carbon atom, a hydrogen atom, a sulfur atom, or a nitrogen atom among these. The number of constituent atoms of the linking group is preferably 4 to 40 and more preferably 6 to 24.

k1, k2, and k3 are k1+k2+k3=1 as the molar fractions of each repeating unit in the polymer. k1 is preferably 0.001 to 0.3 and more preferably 0.01 to 0.1. k2 is preferably 0 to 0.7 and more preferably 0 to 0.5. k3 is preferably 0.3 to 0.99 and more preferably 0.4 to 0.9.

m represents an integer of 1 to 200, preferably an integer of 1 to 100, and more preferably an integer of 1 to 50.

k12 and k13 are k12+k13=1 as the molar fractions of each repeating unit in the polymer. k12 is preferably 0 to 0.7 and more preferably 0 to 0.6. k13 is preferably 0.3 to 1 and more preferably 0.4 to 1.

$R^{13}$, $R^{14}$, and $R^{15}$ are a group which has the same meaning as $R^1$ or a polymerizable group of P. Among these, a group of $R^1$ is preferable, and a hydrogen atom, an alkyl group (preferably with 1 to 3 carbon atoms), or a cyano group is preferable.

$R^{16}$ has the same meaning as the $R^2$ described above. Among these, a hydrogen atom, an alkylene group with 1 to 6 carbon atoms, an arylene group with 6 to 24 (preferably 6 to 10 carbon atoms), a hydroxy group, and a carboxyl group are preferable. q is 0 or 1.

$R^{21}$ and $R^{23}$ preferably have the same meaning as $R^1$.

$R^{22}$ is a chain structure site with a higher molecular weight than that of $R^{21}$ and preferably an alkyl group (preferably with 4 to 60 carbon atoms and more preferably with 6 to 36 carbon atoms), an alkenyl group (preferably with 4 to 60 carbon atoms and more preferably with 6 to 36 carbon atoms), an arylene group (preferably with 4 to 60 carbon atoms and more preferably with 6 to 36 carbon atoms), a halogenated alkyl group (preferably with 4 to 60 carbon atoms and more preferably with 6 to 36 carbon atoms, the halogen atom is preferably a fluorine atom), a (poly)oxy alkylene group-containing group, a (poly)ester group-containing group, a (poly)amide group-containing group, and a (poly)siloxane group-containing group. Examples of the site include a self-condensate of hydroxy group-containing fatty acid, a self-condensate of amino group-containing fatty acid, or the like. At this time, $R^{22}$ may have the substituent T and may appropriately have a hydroxy group, an alkoxy group, an acyl group, and the like. The linking group-containing group described above follows the definition of the linking group L which will be described below. The terminal group thereof is preferably $R^P$ which will be described below.

$R^P$ is a hydrogen atom, a hydroxyl group, or a substituent. The substituent is preferably an alkyl group (preferably with 1 to 24 carbon atoms, more preferably with 1 to 12 carbon atoms, even more preferably with 1 to 6 carbon atoms, and particularly preferably with 1 to 3 carbon atoms), an alkenyl group (preferably with 2 to 24 carbon atoms, more preferably with 2 to 12 carbon atoms, even more preferably with 2 to 6 carbon atoms, and particularly preferably with 2 or 3 carbon atoms), an alkynyl group (preferably with 2 to 24 carbon atoms, more preferably with 2 to 12 carbon atoms, even more preferably with 2 to 6 carbon atoms, and particularly preferably with 2 or 3 carbon atoms), an aralkyl group (preferably with 7 to 22 carbon atoms, more preferably with 7 to 14 carbon atoms, and particularly preferably with 7 to 10 carbon atoms), an aryl group (preferably with 6 to 22 carbon atoms, more preferably with 6 to 14 carbon atoms, and particularly preferably with 6 to 10 carbon atoms), an alkoxy group (preferably with 1 to 24 carbon atoms, more preferably with 1 to 12 carbon atoms, even more preferably with 1 to 6 carbon atoms, and particularly preferably with 1 to 3 carbon atoms), an alkenyloxy group (preferably with 2 to 24 carbon atoms, more preferably with 2 to 12 carbon atoms, even more preferably with 2 to 6 carbon atoms, and particularly preferably with 2 or 3 carbon atoms), an alkynyloxy group (preferably with 2 to 24 carbon atoms, more preferably with 2 to 12 carbon atoms, even more preferably with 2 to 6 carbon atoms, and particularly preferably with 2 or 3 carbon atoms), an aralkyloxy group (preferably with 7 to 22 carbon atoms, more preferably with 7 to 14 carbon atoms, and particularly preferably with 7 to 10 carbon atoms), and an aryloxy group (preferably with 6 to 22 carbon atoms, more preferably with 6 to 14 carbon atoms, and particularly preferably with 6 to 10 carbon atoms).

$R^{24}$ is a hydrogen atom or a substituent and preferably a group which has the same meaning as $R^2$ below. Among these, a hydrogen atom, an alkyl group (preferably with 1 to 24 carbon atoms, more preferably with 1 to 18 carbon atoms, and particularly preferably with 1 to 12 carbon atoms), an alkenyl group (preferably with 2 to 12 carbon atoms and more preferably with 2 to 6 carbon atoms), an aryl group (preferably with 6 to 22 carbon atoms and more preferably with 6 to 14 carbon atoms), and an aralkyl group (preferably with 7 to 23 carbon atoms and more preferably with 7 to 15 carbon atoms) are preferable. At this time, $R^{24}$ may have the substituent T and may appropriately have a hydroxy group, an alkoxy group, an acyl group, and the like.

Examples of $R^2$ include a hydrogen atom or the substituent T. Among these, a hydrogen atom, an alkyl group (preferably with 1 to 24 carbon atoms, more preferably with 1 to 12 carbon atoms, and particularly preferably with 1 to 6 carbon atoms), an alkenyl group (preferably with 2 to 12 carbon atoms and more preferably with 2 to 6 carbon atoms), an aryl group (preferably with 6 to 22 carbon atoms and more preferably with 6 to 14 carbon atoms), an aralkyl group (preferably with 7 to 23 carbon atoms and more preferably with 7 to 15 carbon atoms), an alkoxy group (preferably with 1 to 12 carbon atoms, more preferably with 1 to 6 carbon atoms, and particularly preferably with 1 to 3 carbon atoms), an aryloxy group (preferably with 6 to 22 carbon atoms, more preferably with 6 to 14 carbon atoms, and particularly preferably with 6 to 10 carbon atoms), an aralkyloxy group (preferably with 7 to 23 carbon atoms, more preferably with 7 to 15 carbon atoms, and particularly preferably with 7 to 11 carbon atoms), a cyano group, a carboxyl group, a hydroxy group, a thiol group (a sulfanyl group), a sulfonic acid group, a phosphoric acid group, a phosphonic acid group, an aliphatic heterocyclic group (preferably with 2 to 12 carbon atoms and more preferably with 2 to 6 carbon atoms) which contains an oxygen atom, a (meth)acryloyl group, or an amino group ($NR^N{}_2$: $R^N$ follows the definition described above and is preferably a hydrogen atom or an alkyl group with 1 to 3 carbon atoms).

In other words, the compound of Formula (N-2) preferably has a structure where a polymerizable group is incorporated in a side chain of a polymer chain.

Formula (N-2) is preferably a structure where a polymerizable group is introduced in a carboxyl group of a fatty acid which may have a substituent.

Formula (N-3) is preferably a structure where a polymerizable group is incorporated in at least one terminal of a polymer.

Examples of the substituent include a structure where an arbitrary substituent is arranged at the terminal of the linking group described above and examples of the substituent at the terminal include the substituent T below and the examples of the $R^{b11}$ described above are preferable.

Examples of the substituent T include the examples of the substituents of $Z^{11}$ described above.

When a compound, a substituent, or the like includes an alkyl group, an alkenyl group, and the like, these may be linear or branched and may be substituted or unsubstituted. In addition. when an aryl group, a heterocyclic group, and the like are included, these may be a single ring or a condensed ring and may be substituted or unsubstituted.

In the present specification, it is possible to combine each technical item such as temperature and thickness as well as the options for the substituent or the linking group of the compound even when the lists thereof are each independently described.

A macromonomer which has an ethylenic unsaturated bond at the terminal may be used as the macromonomer described above. Here, the macromonomer consists of a portion of a polymerizable functional group which has a polymer chain portion and an ethylenic unsaturated double bond at the terminal thereof.

The copolymerization ratio of a repeating unit which is derived from the macromonomer (X) is not particularly limited, but is preferably 1 mass % or more in the polymer which forms the binder particles, more preferably 3 mass % or more, and particularly preferably 5 mass % or more. The upper limit is preferably 60 mass % or less, more preferably 50 mass % or less, and particularly preferably 40 mass % or less.

Elements of Binder Particles

A weight-average molecular weight of the polymer which forms the binder particles is preferably 5,000 or more, more preferably 10,000 or more, and particularly preferably 30.000 or more. The upper limit is preferably 1,000,000 or less, and more preferably 200,000 or less.

The blending amount of the binder particles is preferably 0.1 parts by mass or more with respect to 100 parts by mass of the inorganic solid electrolyte (in a case of using an active material, including the active material) described above, more preferably 0.3 parts by mass or more, and particularly preferably 1 part by mass or more. The upper limit is preferably 20 parts by mass or less, more preferably 10 parts by mass or less, and particularly preferably 5 parts by mass or less.

In the solid content of the solid electrolyte composition, the binder particles are preferably 0.1 mass % or more, more preferably 0.3 mass % or more, and particularly preferably 1 mass % or more. The upper limit is preferably 20 mass % or less, more preferably 10 mass % or less, and particularly preferably 5 mass % or less.

By using the binder particles in the ranges described above, it is possible to more effectively realize both the adhering property of the inorganic solid electrolyte and suppression of the interface resistance.

The binder particles may be used as one type individually or may be used in a combination of a plurality of types. In addition, the binder particles may be used in combination with other particles.

In the present invention, the average particle diameter of the binder particles is preferably set to 1,000 nm or less, preferably 750 nm or less, more preferably 500 nm or less, even more preferably 300 nm or less, and particularly preferably 200 nm or less. The lower limit is preferably set to 10 nm or more, more preferably 20 nm or more, even more preferably 30 nm or more, and particularly preferably 50 nm or more. In the present invention, unless otherwise stated, the average particle diameter of the binder particles is the diameter under conditions which were measured by measurement of the average particle diameter of the binder in the section of the Examples which will be described below.

When the inorganic solid electrolyte is in particle form, the particle diameter of the binder particles described above is preferably smaller than the average particle diameter of the inorganic solid electrolyte.

Setting the size of the binder particles in the ranges described above makes it possible to realize favorable adhesiveness and suppression of interface resistance.

Here, it is possible to perform the measurement from the created all-solid secondary battery, for example, by taking apart a battery and peeling off the electrodes and then measuring the electrode material on the basis of the method of measuring a particle diameter of a binder which will be described below and eliminating the measurement values of the particle diameters of the particles other than the binder which was measured beforehand.

In the present invention, the polymer which configures the binder particles is preferably non-crystalline. A polymer being "non-crystalline" typically refers to a polymer where a heat absorption peak which is caused by crystals melting is not seen when measuring using the Tg measurement method which will be described below.

Here, it is possible to perform the measurement from the created all-solid secondary battery, for example, by taking apart a battery, inserting electrodes in water, and dispersing the material, and then performing filtration, collecting the remaining solids and measuring the glass transition temperature by the Tg measurement method which will be described below.

The binder particles may only consist of a polymer which forms the binder particles or may be formed in a form which includes another type of material (a polymer, a low molecular compound, an inorganic compound, and the like). A binder particle which only consists of the constituent polymer is preferable.

In the present invention, by using different core-shell particles with a difference in Tg of 50° C. or more for a binder. favorable performances are exhibited in a usage with respect to an all-solid secondary battery. The reason thereof is understood as described below. High Tg components are not easily softened and can maintain a circular form even in a step of mixing and heating inorganic electrolyte particles (in a case of using an active material, the active material is also included) and binder particles during manufacturing. On the other hand, the inorganic electrolyte particles (in a case of using an active material, the active material is also included) are favorably adhered due to the low Tg component. It is considered that, due to this, a firmly adhered state with flexibility is realized by the low Tg section while securing favorable ionic conductivity without fully filling the gaps between the inorganic electrolyte particles.

It is possible to produce the core-shell particles which form the binder described above by a normal method. Examples thereof include an emulsion polymerization method in which monomers of which Tg may be different are successively added dropwise into a reaction medium when forming the polymer. In other words, in this aspect, the core particles which are formed of the initially dropwise-added components are formed in the medium and shell sections are formed by covering the core particles with the subsequently dropwise-added components. At this time, it is possible to generate core-shell particles which have a desirable Tg difference by appropriately selecting monomers as two components. The particles may be single particles for which addition and polymerization are continuously performed or may be non-single particles where once the core is formed as a particle (cooled), the core is further covered with a shell.

Here, the single particle has the meaning that polymer chains which are continuous with a covalent bond partially form a core section (for example, high Tg) and a shell section (for example, low Tg).

Polymerization Initiator

A polymerization initiator is preferably contained in the synthesis of the polymer compound which forms the binder of the present invention. Among these, examples thereof include blending a radical polymerization initiator.

Examples of the thermal radical polymerization initiator which is cleaved by heat and generates an initiating radical include ketone peroxides such as methyl ethyl ketone peroxide, methyl isobutyl ketone peroxide, acetyl acetone peroxide, cyclohexanone peroxide, and methyl cyclohexanone peroxide: hydroperoxides such as 1,1,3,3-tetramethyl butyl hydroperoxide, cumene hydroperoxide, and t-butyl hydroperoxide: diacyl peroxides such as diisobutylyl peroxide, bis-3,5,5-trimethyl hexanoyl peroxide, lauroyl peroxide, benzoyl peroxide, and m-toluyl benzoyl peroxide; dialkyl peroxides such as dicumyl peroxide, 2,5-dimethyl-2,5-di(t-butylperoxy) hexane, 1,3-bis(t-butylperoxy isopropyl) hexane, t-butyl cumyl peroxide, di-t-butyl peroxide, and 2,5-dimethyl-2,5-di(t-butylperoxy) hexene: peroxy ketals such as 1,1-di(t-butylperoxy-3,5,5-trimethyl) cyclohexane, 1,1-di-t-butylperoxy cyclohexane, and 2,2-di(t-butylperoxy) butane; alkyl peresters such as t-hexyl peroxy pivalate, t-butyl peroxy pivalate, 1,1,3,3-tetramethyl butyl peroxy-2-ethyl hexanoate, t-amyl peroxy-2-ethyl hexanoate, t-butyl peroxy-2-ethyl hexanoate, t-butyl peroxy isobutyrate, di-t-butyl peroxy hexahydro terephthalate, 1,1,3,3-tetramethyl butyl peroxy-3,5,5-trimethyl hexanate, t-amyl peroxy-3,5,5-trimethyl hexanoate, t-butyl peroxy-3,5,5-trimethyl hexanoate, t-butyl peroxy acetate, t-butyl peroxy benzoate, and dibutyl peroxy trimethyl adipate; peroxy carbonates such as 1,1,3,3-tetramethyl butyl peroxy neodicarbonate, α-cumyl peroxy neodicarbonate, t-butyl peroxy neodicarbonate, di-3-methoxy butyl peroxy dicarbonate, di-2-ethylhexyl peroxy dicarbonate, bis(1,1-butyl cyclohexaoxy dicarbonate), diisopropyloxy dicarbonate, t-amyl peroxy isopropyl carbonate, t-butyl peroxy isopropyl carbonate, t-butyl peroxy-2-ethylhexyl carbonate, and 1,6-bis(t-butyl peroxy carboxy) hexane; 1,1-bis(t-hexyl peroxy) cyclohexane, (4-t-butyl cyclohexyl) peroxy dicarbonate, and the like.

Specific examples of an azo compound which is used as an azo-based (AIBN and the like) polymerization initiator include 2,2'-azobisisobutyronitrile, 2,2'-azobis(2-methyl butyronitrile), 2,2'-azobis(2,4-dimethyl valeronitrile), 1,1'-azobis-1-cyclohexane carbonitrile, dimethyl-2,2'-azobis isobutyrate, 4,4'-azobis-4-cyano valeric acid, 2,2'-azobis-(2-amidino propane) dihydrochloride, and the like (refer to JP2010-189471A and the like). Alternatively, dimethyl-2,2'-azobis(2-methyl propionate) (product name V-601, manufactured by Wako Pure Chemical Industries, Ltd.) and the like are also favorably used.

As the radical polymerization initiator, other than the thermal radical polymerization initiator described above, it is possible to use a radical polymerization initiator which generates initiating radicals using light, electron beams, or radiation.

Examples of the radical polymerization initiator include benzoin ether, 2,2-dimethoxy-1,2-diphenyl ethan-1-one [IRGACURE 651, manufactured by BASF Corporation, trademark], 1-hydroxy-cyclohexyl-phenyl-ketone [IRGACURE 184, manufactured by BASF Corporation, trademark], 2-hydroxy-2-methyl-1-phenyl-propan-1-one [DAROCUR 1173, manufactured by BASF Corporation, trademark], 1-[4-(2-hydroxy ethoxy)-phenyl]-2-hydroxy-2-methyl-1-propan-1-one [IRGACURE 2959, manufactured by BASF Corporation, trademark], 2-hydroxy-1-[4-[4-(2-hydroxy-2-methyl-propionyl)-benzyl]phenyl]-2-methyl-propan-1-one [IRGACURE 127, manufactured by BASF Corporation, trademark], 2-methyl-1-(4-methyl thiophenyl)-2-morpholino propan-1-one [IRGACURE 907, manufactured by BASF Corporation, trademark], 2-benzyl-2-dimethyl amino-1-(4-morpholino phenyl)-butanone-1 [IRGACURE 369, manufactured by BASF Corporation, trademark], 2-(dimethyl amino)-2-[(4-methylphenyl) methyl]-1-[4-(4-morpholinyl) phenyl]-1-butanone [IRGACURE 379, manufactured by BASF Corporation, trademark], 2,4,6-trimethyl benzoyl-diphenyl-phosphine oxide [DAROCUR TPO, manufactured by BASF Corporation, trademark], bis(2,4,6-trimethyl benzoyl)-phenyl phosphine oxide [IRGACURE 819, manufactured by BASF Corporation, trademark], bis ($\eta^5$-2,4-cyclopentadien-1-yl)-bis(2,6-difluoro-3-(1H-pyrrol-1-yl)-phenyl) titanium [IRGACURE 784, manufactured by BASF Corporation, trademark], 1,2-octanedione, 1-[4-(phenylthio)-, 2-(O-benzoyl oxime)] [IRGACURE OXE 01, manufactured by BASF Corporation, trademark], ethanone, 1-[9-ethyl-6-(2-methylbenzoyl)-9H-carbazol-3-yl]-, 1-(O-acetyl oxime) [IRGACURE OXE 02, manufactured by BASF Corporation, trademark], and the like.

It is possible to use the radical polymerization initiators as one type individually or in a combination of two or more types.

The polymerization initiator is preferably applied with content of 0.01 parts by mass to 20 parts by mass with respect to 100 parts by mass of the monomer.

Polymerization Inhibitor

A polymerization inhibitor may be added in the synthesis of the polymer compound which forms the binder. As the polymerization inhibitor described above, it is possible to use, for example, phenols such as hydroquinone, tert-butyl hydroquinone, catechol, and hydroquinone monomethyl ether; quinones such as benzoquinone and diphenyl benzoquinone; phenothiazines; coppers: 2,2,6,6-tetramethyl piperidine I-oxyl, and the like.

The content of the polymerization inhibitor is not particularly limited; however, 0 ppm to 20,000 ppm (parts by mass standard), preferably 100 ppm to 10,000 ppm, more preferably 300 ppm to 8,000 ppm is preferably added with respect to 1 part of an organic curing component. When the added amount of the polymerization inhibitor is excessively small, since polymerization occurs while rapidly generating heat when sealing and curing, the adhesiveness with a reflector package substrate is decreased and, when thermal shock is applied thereto, peeling easily occurs at the sealing material/substrate interface. On the other hand, if the added amount of the polymerization inhibitor is excessively large, the curing speed is remarkably decreased when curing the sealing agent under an atmosphere and surface curing defects are caused.

A reaction medium may be used for the synthesis of the polymer compound which forms the binder. Examples of the medium which is favorably used include an aliphatic compound solvent and an ether solvent, preferably n-heptane, n-hexane, cyclohexane, cyclopentane, octane, decane, dibutyl ether, diisopropyl ether, t-butyl methyl ether, cyclohexyl methyl ether, and the like.

The temperature of the polymerization reaction is not particularly limited and may be adjusted according to the applied monomer or reaction medium; however, for example, 60° C. or more is preferable, 70° C. or more is more preferable, and 80° C. or more is particularly preferable. There is no specific upper limit; however, 150° C. or less is practical.

(Dispersive Medium)

In the solid electrolyte composition of the present invention, a dispersive medium may be used for dispersing each of the components described above. Examples of the dispersive medium include a water-soluble organic solvent. Specific examples thereof include the following.

Alcohol Compound Solvent

Methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol. xylitol, 2-methyl-2,4-pentanediol, 1,3-butanediol, 1,4-butanediol, and the like Ether Compound Solvent (Including a Hydroxyl Group-Containing Ether Compound)

Dimethyl ether, diethyl ether, diisopropyl ether, dibutyl ether, t-butyl methyl ether, cyclohexyl methyl ether, anisole, tetrahydrofuran, alkylene glycol alkyl ether (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, diethylene glycol monobutyl ether, and the like), and the like Amide Compound Solvent N,N-dimethyl formamide, 1-methyl-2-pyrrolidone, 2-pyrrolidinone, 1,3-dimethyl-2-imidazolidinone, ε-caprolactam, formamide, N-methyl formamide, acetamide, N-methyl acetamide, N,N-dimethyl acetamide, N-methyl propane amide, hexamethylphosphoric triamide, and the like Ketone Compound Solvent Acetone, methyl ethyl ketone, methyl isobutyl ketone, cyclohexanone, and the like Aromatic Compound Solvent Benzene, toluene, and the like Aliphatic Compound Solvent Hexane, heptane, cyclohexane, methyl cyclohexane, octane, pentane, cyclopentane, and the like Nitrile Compound Solvent Acetonitrile and the like In the present invention, among these, an ether compound solvent, a ketone compound solvent, an aromatic compound solvent, and an aliphatic compound solvent are preferably used. The boiling point of the dispersive medium at a normal pressure (1 atm) is preferably 50° C. or more, and more preferably 80° C. or more. The upper limit is preferably 220° C. or less, and more preferably 180° C. or less. The dispersive medium described above may be used as one type individually or may be used in a combination of two or more types.

(Cathode Active Material)

A cathode active material may be contained in the solid electrolyte composition of the present invention. Due to this, it is possible to make a composition for a cathode material. A transition metal oxide is preferably used for the cathode active material and, among these, it is preferable to have a transition element $M^a$ (one or more types of elements which are selected from Co, Ni, Fe, Mn, Cu, and V). In addition, mixed elements $M^b$ (elements of Group I (Ia) in the metal periodic table other than lithium, elements of group II (IIa), Al, Ga, In, Ge, Sn, Pb, Sb, Bi, Si, P, B, and the like) may be mixed therein. Examples of the transition metal oxide include a specific transition metal oxide which includes oxides which are represented by any of Formulas (MA) to (MC) below or examples of other transition metal oxides include $V_2O_5$, $MnO_2$, and the like. A cathode active material in particle form may be used for the cathode active material. In detail, it is possible to use a transition metal oxide which is able to reversibly insert and discharge lithium ions: however, the specific transition metal oxide described above is preferably used.

Examples of the transition metal oxide favorably include an oxide which includes the transition element $M^a$ and the like. At this time, the mixed elements $M^b$ (preferably Al) and the like may be mixed therein. The mixed amount is preferably 0 mol % to 30 mol % with respect to the amount of the transition metal. A transition metal oxide which is synthesized by mixing such that the molar ratio of Li/$M^a$ is 0.3 to 2.2 is more preferable.

[Transition Metal Oxide (Layered Rock Salt-Type Structure) which is Represented by Formula (MA)]

A lithium-containing transition metal oxide is preferably represented by the formula below among these.

$$Li_aM^1O_b \qquad (MA)$$

In the formula, $M^1$ has the same meaning as the Ma described above. a represents 0 to 1.2 (preferably 0.2 to 1.2) and is preferably 0.6 to 1.1. b represents 1 to 3 and is preferably 2. Some $M^1$ may be substituted with the mixed elements $M^b$ described above. The transition metal oxide which is represented by Formula (MA) described above typically has a layered rock salt-type structure.

The present transition metal oxide is more preferably represented by each of the formulas below.

$$Li_gCoO_k \qquad (MA-1)$$

$$Li_gNiO_k \qquad (MA-2)$$

$$Li_gMnO_k \qquad (MA-3)$$

$$Li_gCo_jNi_{1-j}O_k \qquad (MA-4)$$

$$Li_gNi_jMn_{1-j}O_k \qquad (MA-5)$$

$$Li_gCo_jNi_iAl_{1-j-i}O_k \qquad (MA-6)$$

$$Li_gCo_jNi_iMn_{1-j-i}O_k \qquad (MA-7)$$

Here, g has the same meaning as the a described above. j represents 0.1 to 0.9. i represents 0 to 1. Here, 1-j-i is 0 or more. k has the same meaning as the b described above. Specific examples of the transition metal compound described above include $LiCoO_2$ (lithium cobalt oxide [LCO]), $LiNi_2O_2$ (lithium nickel oxide), $LiNi_{0.85}Co_{0.01}Al_{0.05}O_2$ (lithium nickel cobalt aluminum oxide [NCA]), $LiNi_{0.33}Co_{0.33}Mn_{0.33}O_2$ (lithium nickel manganese cobalt oxide [NMC]), and $LiNi_{0.5}Mn_{0.5}O_2$ (lithium manganese nickel oxide).

Preferable examples of the transition metal oxide which is represented by Formula (MA) also include an example which is represented by the following when shown with a different notation, although a part is overlapped.

$$Li_gNi_xMn_yCo_zO_2 \ (x>0.2, y>0.2, z\geq 0, x+y+z=1) \qquad (i)$$

Representative Example $$Li_gNi_{1/3}Mn_{1/3}Co_{1/3}O_2$$

$$Li_gNi_{1/2}Mn_{1/2}O_2$$

$$Li_gNi_xCo_yAl_zO_2 \ (x>0.7, y>0.1, 0.1>z\geq 0.05, x+y+z=1) \qquad (ii)$$

Representative Example $$Li_gNi_{0.8}Co_{0.15}Al_{0.05}O_2$$

[Transition Metal Oxide (Spinel Type Structure) which is Represented by Formula (MB)]

The lithium-containing transition metal oxide is also preferably represented by Formula (MB) below among these.

$$Li_cM^2_2O_d \qquad (MB)$$

In the formula, $M^2$ has the same meaning as the Ma described above. c represents 0 to 2 (preferably 0.2 to 2) and is preferably 0.6 to 1.5, d represents 3 to 5 and is preferably 4.

The transition metal oxide which is represented by Formula (MB) is more preferably represented by each of the formulas below.

$$Li_mMn_2O_n \qquad (MB-1)$$

$$Li_mMn_pAl_{2-p}O_n \qquad (MB-2)$$

$$Li_mMn_pNi_{2-p}O_n \qquad (MB-3)$$

m has the same meaning as c. n has the same meaning as d. p represents 0 to 2.

Specific examples of the transition metal compound described above include $LiMn_2O_4$ and $LiMn_{1.5}Ni_{0.5}O_4$.

Preferable examples of the transition metal oxide which is represented by Formula (MB) also further include an example which is represented by the following.

$$LiCoMnO_4 \qquad (a)$$

$$Li_2FeMn_3O_8 \qquad (b)$$

$$Li_2CuMn_3O_8 \qquad (c)$$

$$Li_2CrMn_3O_8 \qquad (d)$$

$$Li_2NiMn_3O_8 \qquad (e)$$

From the viewpoint of a high capacity and a high output, an electrode which includes Ni is more preferable among the above.

[Transition Metal Oxide which is Represented by Formula (MC)]

As the lithium-containing transition metal oxide, a lithium-containing transition metal phosphorus oxide is also preferably used and, among these, a lithium-containing transition metal phosphorus oxide which is represented by Formula (MC) below is also preferable.

$$Li_eM^3(PO_4)_f \qquad (MC)$$

In the formula, e represents 0 to 2 (preferably 0.2 to 2) and is preferably 0.5 to 1.5. f represents 1 to 5 and is preferably 0.5 to 2.

The $M^3$ described above represents one or more types of elements which are selected from V, Ti, Cr, Mn, Fe, Co, Ni, and Cu. The $M^3$ described above may be substituted with other metal such as Ti, Cr, Zn, Zr, Nb, and the like other than the mixed elements $M^b$ described above. Specific examples thereof include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, and monocline nasicon type vanadium phosphate salt such as $Li_3V_2(PO_4)_3$ (lithium vanadium phosphate).

Here, the values of a, c, g, m, and e described above which represent the composition of Li are values which change according to charging or discharging and are typically evaluated using values in a stable state when Li is contained. In Formulas (a) to (e) described above, the composition of Li is shown as a specific value; however, this also changes according to the operation of the battery in the same manner.

The average particle size (diameter) of the cathode active material is not particularly limited; however, 0.1 µm to 50 µm is preferable. In order to make the cathode active material a predetermined particle size, a general grinder or classifier may be used. A cathode active material which is obtained by a baking method may be used after being cleansed using water, an acidic aqueous solution, an alkali aqueous solution, or an organic solvent.

The concentration of the cathode active material is not particularly limited; however, in 100 mass % of the solid component in the solid electrolyte composition, 20 mass % to 90 mass % is preferable, and 40 mass % to 80 mass % is more preferable.

The cathode active material described above may be used as one type individually or may be used in a combination of two or more types.

(Anode Active Material)

An anode active material may be contained in the solid electrolyte composition of the present invention. Due to this, it is possible to make a composition for an anode material. The anode active material is preferably able to reversibly insert and discharge lithium ions. The material is not particularly limited and examples thereof include carbon material, metal oxides such as tin oxide and silicon oxide, metal composite oxide, lithium single body or lithium alloy such as lithium aluminum alloy, metals such as Sn, In, Al, or Si which are able to form an alloy with lithium, and the like. Among these, in terms of the reliability, carbon material or lithium composite oxide is preferably used. In addition, the metal composite oxide is preferably able to occlude or discharge lithium. The material thereof is not particularly limited; however, titanium and/or lithium is preferably contained as a constituent component from the viewpoint of the high current density charging and discharging characteristics.

The carbon material which is used as an anode active material is a material which substantially consists of carbon. Examples thereof include carbon material where petroleum pitch, natural graphite, artificial graphite such as vapor phase grown graphite, or various types of synthetic resins such as a PAN-based resin or a furfuryl alcohol resin are baked. Furthermore, examples thereof also include various types of carbon fibers such as PAN-based carbon fiber, cellulose-based carbon fiber, pitch-based carbon fiber, vapor phase grown carbon fiber, dehydrated PVA-based carbon fiber, lignin carbon fiber, glass carbon fiber, and active carbon fiber, mesophase microspheres, graphite whiskers, flat graphite, and the like.

It is also possible to divide the carbon materials into non-graphitizable carbon material and graphite-based carbon material according to the degree of graphitization. In addition, the carbon material preferably has the surface separation, density. or the size of the crystallite which is described in JP1987-22066A (JP-S62-22066A), JP1990-6856A (JP-H2-6856A), and JP1991-45473A (JP-H3-45473A). The carbon material is not necessarily a single material and it is also possible to use the mixture of natural graphite and artificial graphite which is described in JP1993-90844A (JP-H5-90844A), the graphite which has a covered layer which is described in JP1994-4516A (JP-H6-4516A), and the like.

The metal oxide and the metal composite oxide which are applied as anode active materials are particularly preferably non-crystalline oxide and, moreover, chalcogenide which is a reaction product of a metal element and an element of group XVI in the periodic table is also preferably used. "Non-crystalline" here has the meaning of having a broad scattering range which has a peak in a region of 20° to 40° in a 2θ value by X-ray diffraction method using a CuKα line and may have a crystalline diffraction line. The strongest strength out of the crystalline diffraction lines which are seen at 40° or more and 70° or less at the 2θ value is preferably 100 times or less the diffraction line strength of the peak of the broad scatter range which is seen at 200 or more and 40° or less at the 2θ value, more preferably 5 times or less, and it is particularly preferable not to have a crystalline diffraction line.

Among compound groups consisting of the non-crystalline oxides and chalcogenides described above, non-crystalline oxides of a half metal element and chalcogenide are more preferable, and oxides consisting of one individual type of elements of group XIII (IIIB) to group XV (VB) in the periodic table, Al, Ga, Si, Sn, Ge. Pb, Sb, and Bi or a combination of two or more types thereof and chalcogenide are particularly preferable. Specific examples of preferable non-crystalline oxide and chalcogenide preferably include $Ga_2O_3$, $SiO$, $GeO$, $SnO$, $SnO_2$, $PbO$, $PbO_2$, $Pb_2O_3$, $Pb_2O_4$, $Pb_3O_4$, $SbO_3$, $Sb_2O_4$, $Sb_2O_5$, $Bi_2O_3$, $Bi_2O_4$, $SnSiO_3$, $GeS$, $SnS$, $SnS_2$, $PbS$, $PbS_2$, $Sb_2S_3$, $Sb_2S_5$, $SnSiS_3$, and the like. In addition, these may be composite oxide with lithium oxide, for example, $Li_2SnO_2$.

The average particle size (diameter) of the anode active material is preferably 0.1 µm to 60 µm. In order to make a predetermined particle size, a well-known grinder or classifier is used. For example, a mortar, a ball mill, a sand mill, a vibratory ball mill, a satellite ball mill, a planet ball mill, a swirling air flow type jet mill, a sieve, and the like are favorably used. When grinding, it is also possible to perform wet grinding where water or an organic solvent such as methanol is also present as necessary. Classification is preferably performed in order to obtain the desired particle diameter. The classification method is not particularly limited and it is possible to use a sieve, a pneumatic classification apparatus, or the like as necessary. It is possible to use both dry and wet classification methods.

It is possible to calculate the chemical formula of the compound which is obtained by the baking method described above from the mass difference of the powder before and after baking with the inductive coupling plasma (ICP) emission spectral analysis method as a simple measurement method.

Examples of an anode active material which is able to be used along with a non-crystalline oxide anode active material which is mainly Sn, Si, or Ge favorably include carbon material which is able to occlude and discharge lithium ions or lithium metal, lithium, lithium alloy, or metal which is able to make an alloy with lithium.

The concentration of the anode active material is not particularly limited: however, in 100 mass % of the solid components in the solid electrolyte composition, 10 mass % to 80 mass % is preferable, and 20 mass % to 70 mass % is more preferable.

Here, in the embodiment described above, examples of containing a cathode active material or anode active material in the solid electrolyte composition according to the present invention are shown; however, the present invention is not to be interpreted as being limited to this. For example, a paste which includes a cathode active material or anode active material may be prepared as a binder composition which does not include the binder described above. At this time, the inorganic solid electrolyte described above is preferably contained. An inorganic solid electrolyte layer may be formed by combining a cathode active material or anode active material which is generally used as above and using the solid electrolyte composition according to the preferable embodiment of the present invention described above. In addition, a conductive assisting agent may be appropriately contained in the cathode and anode active layers as necessary. As a general electrically conductive material, it is possible to include graphite, carbon black, acetylene black, Ketjen black, carbon fiber such as carbon nanotubes, metallic powder, metallic fiber, polyphenylene derivative, and the like.

The anode active material described above may be used as one type individually or may be used in a combination of two or more types.

<Current Collector (Metallic Foil)>

An electrically conductive body which does not cause chemical change is preferably used as the cathode and anode current collectors. As the cathode current collector, other than aluminum, stainless steel, nickel, titanium, and the like, a cathode current collector where the surface of aluminum or stainless steel is treated with carbon, nickel, titanium, or silver is preferable and, among these, aluminum and aluminum alloy are more preferable. As the anode current collector, aluminum, copper, stainless steel, nickel, and titanium are preferable, and aluminum, copper, and copper alloy are more preferable.

As the form of the current collector described above, a film sheet form is generally used; however, it is also possible to use a net, a punched form, a lath, a porous body, a foam body, a molded body of a group of fibers, and the like. The thickness of the current collector described above is not particularly limited; however, 1 µm to 500 µm is preferable. In addition, roughness is also preferably formed on the surface of the current collector by a surface treatment.

<Production of all-Solid Secondary Battery>

The all-solid secondary battery may be produced by a normal method. In detail, examples thereof include a method of coating a metallic foil which is to be a current collector with the solid electrolyte composition described above and making an electrode sheet for a battery on which a film is formed. For example, a film is formed by coating a metallic foil with a composition which is to be a cathode material. Subsequently, a film is formed by coating an upper surface of a cathode active material layer of the electrode sheet for a battery with a composition of an inorganic solid electrolyte. Furthermore, it is possible to obtain a desired all-solid secondary battery structure by forming a film of an anode active material in the same manner and adding a current collector (a metallic foil) on an anode side. Here, the method for applying each of the compositions described above may be a normal method. At this time, a heating process is preferably carried out after applying each of a composition which forms a cathode active material layer, a composition which forms an inorganic solid electrolyte layer, and a composition which forms an anode active material layer. The heating temperature is not particularly limited; however, 30° C. or more is preferable, and 60° C. or more is more preferable. The upper limit is preferably 300° C. or less, and more preferably 250° C. or less. Heating in these temperature ranges makes it possible to maintain the particle shape while favorably softening a binder formed by core-shell particles. Due to this, in an all-solid secondary battery, it is possible to obtain favorable binding properties and ionic conductivity without applying pressure.

<Use of all-Solid Secondary Battery>

It is possible to apply the all-solid secondary battery according to the present invention in various types of uses. The applied aspect is not particularly limited; however, in a case of being mounted on electronic equipment, examples thereof include notebook personal computers, pen-input personal computers, mobile personal computers, electronic book readers, mobile phones, handset cordless phones, pagers, handy terminals, mobile faxes, mobile copiers, mobile printers, headphone stereos, video movies, liquid crystal televisions, handy cleaners, portable CDs, mini discs, electrical shavers, transceivers, electronic notebooks, calculators, memory cards, mobile tape recorders, radios, backup power supplies, and the like. Examples of commercial uses other than these include cars, electrically driven vehicles, motors, lighting equipment, toys, game machines, load conditioners, clocks, stroboscopes, cameras, medical equipment (pacemakers, hearing aids, shoulder massagers, and the like), and the like. Furthermore, various types of military uses or space uses are possible. In addition, combination with solar batteries is also possible.

Among these, the present invention is preferably applied to applications for which high capacity and high rate discharging characteristics are demanded. For example, in electric storage facilities and the like where high capacity is expected in future, high reliability is essential and, moreover, there is a demand to also achieve battery performance. In addition, usage in which secondary batteries with high capacities are mounted on electric cars or the like and charging is performed every day at home are expected, and more reliability will be demanded during overcharging. The present invention favorably corresponds to these usages and can exhibit excellent effects.

Each of the following applied forms is derived from the preferable embodiments of the present invention.

A solid electrolyte composition (a cathode or anode composition for electrodes) which includes an active material which is able to insert and discharge metal ions which belong to group I or group II in the periodic table.

An electrode sheet for a battery where the solid electrolyte composition described above is formed into a film on a metallic foil.

An all-solid secondary battery which is equipped with a cathode active material layer, an anode active material layer, and an inorganic solid electrolyte layer, in which at least one of the cathode active material layer, the anode active material layer, or the inorganic solid electrolyte layer described above is formed of the solid electrolyte composition.

A method for manufacturing an electrode sheet for a battery in which the solid electrolyte composition is arranged on a metallic foil, and the result is formed into a film.

A method for manufacturing an all-solid secondary battery which manufactures an all-solid secondary battery via the method for manufacturing the electrode sheet for a battery described above.

An all-solid secondary battery refers to a secondary battery where a cathode, an anode, and electrolyte are all formed by a solid body. In other words, it is distinguished from an electrolytic solution type secondary battery which uses a carbonate-based solvent as an electrolyte. In this, the present invention presupposes an inorganic all-solid secondary battery. All-solid secondary batteries are classified as polymer all-solid secondary batteries which use a polymer compound such as polyethylene oxide as an electrolyte and the inorganic all-solid secondary batteries which use LLT or LLZ described above. Here, the application of a polymer compound to the inorganic all-solid secondary battery is not prevented and it is possible to apply a polymer compound as a binder of a cathode active material, an anode active material, and inorganic solid electrolyte particles.

The inorganic solid electrolyte is distinguished from an electrolyte (polymer electrolyte) which has the polymer compound described above as an ionic conductive medium and an electrolyte where an inorganic compound is the ionic conductive medium. Specific examples thereof include the LLT or LLZ described above. The inorganic solid electrolyte does not discharge cations (Li ions) itself but exhibits a function of transferring ions. With respect to this, a material which is a supply source of ions which discharges cations (Li ions) when added to an electrolytic solution or a solid electrolyte layer may be called an electrolyte; however, this is called an "electrolyte salt" or "support electrolyte" when being distinguished from an electrolyte as the ion transferring material described above. Examples of the electrolyte salt include lithium bistrifluoromethane sulfonimide (LiTFSI).

When referring to a "composition" in the present invention, the meaning is a mixture where two or more types of components are evenly mixed. However, it is sufficient if the evenness is substantially maintained and aggregation or uneven distribution may be generated in a part in the range in which the desired effects are exhibited. In addition, when referring to a solid electrolyte composition in particular, this basically refers to a composition (typically a paste form) which is to be a material for forming an electrolyte layer and an electrolyte layer which is formed by curing the composition described above is not included therein.

EXAMPLES

More detailed description will be given below of the present invention based on Examples: however, the present invention is not to be interpreted as being limited thereto. Unless otherwise stated, "parts" and "%" in Examples below are based on mass.

Examples and Comparative Examples (Synthesis Example of Resin) . . . Synthesis of a Single Core-Shell Particle 448 g of heptane (manufactured by Wako Pure Chemical Industries, Ltd.) was added to a 2 L three-neck flask to which a reflux cooling pipe and a gas introduction cock were attached and, after introducing nitrogen gas at a flow rate of 200 mL/min for 10 minutes, the temperature was increased to 95° C. A liquid (a liquid where 90.0 g of a 40 mass % heptane solution of a macromonomer M-1, 250.0 g of methyl methacrylate [A-4] (manufactured by Wako Pure Chemical Industries, Ltd.), and 1.4 g of V-601 (manufactured by Wako Pure Chemical Industries, Ltd.) were mixed) which was prepared in another container was added dropwise thereto for 1 hour (a precursor K-11). After completing the dropwise addition, a liquid (a liquid where 10.0 g of a 40 mass % heptane solution of the macromonomer M-1 and 110.0 g of 2-ethylhexyl acrylate [A-7] (manufactured by Wako Pure Chemical Industries, Ltd.) were mixed) which was prepared in another container was added dropwise thereto for 1 hour. After completing the dropwise addition, 0.5 g of V-601 was added thereto. After that, a dispersion liquid of a resin B-1 was obtained by cooling to room temperature after stirring at 95° C. for 2 hours and filtering. The concentration of the solid contents was 46.2% and the particle diameter was 193 nm.

Figure 4:
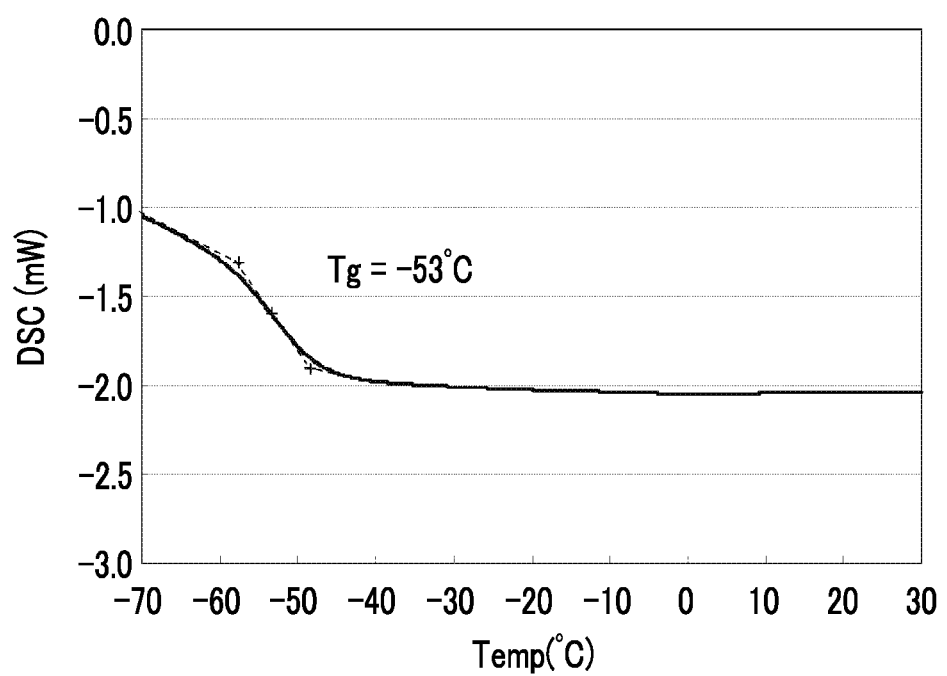
FIG. 4 is a graph which shows the results of DSC measurement of a polymer which forms a binder which was prepared in the Examples.

Here, Tg 1 in Table 3 refers to Tg of the precursor K-11 (core) which was formed by previous dropwise addition and Tg 2 refers to Tg of a polymer (shell) which was obtained by polymerizing a monomer which was added dropwise thereto later in another container in the same manner as the precursor K-11 described above. The measurement results of DSC relating to an example of a polymer compound which forms a shell are shown in FIG. 4.

Other exemplified binders (B-2 to B-9 and B-11 to B-23) were also prepared with the same method (refer to Table I below).

(Synthesis Example of Resin) . . . Synthesis of Non-Single Core-Shell Particle 448 g of heptane (manufactured by Wako Pure Chemical Industries, Ltd.) was added to a 2 L three-neck flask to which a reflux cooling pipe and a gas introducing cock were attached and, after introducing nitrogen gas at a flow rate of 200 mL/min for 10 minutes, the temperature was increased to 95° C. A liquid (a liquid where 100.0 g of a 40 mass % heptane solution of the macromonomer M-1, 210 g of methyl methacrylate [A-4] (manufactured by Wako Pure Chemical Industries, Ltd.), 20 g of dimethylaminoethyl methacrylate [A-63](manufactured by Tokyo Chemical Industry Co., Ltd.), and 1.4 g of V-601 (manufactured by Wako Pure Chemical Industries, Ltd.) are mixed) which was prepared in another container was added dropwise thereto for 2 hours. After completing the dropwise addition, 0.5 g of V-601 was added thereto. After that, a precursor K-101 was obtained by cooling to room temperature after stirring at 95° C. for 2 hours. 350 g of heptane (manufactured by Wako Pure Chemical Industries, Ltd.) was added to a 2 L three-neck flask to which a reflux cooling pipe and a gas introducing cock were attached and, after introducing nitrogen gas at a flow rate of 200 mL/min for 10 minutes, the temperature was increased to 95° C. A liquid (a liquid where 120.0 g of 2-ethylhexyl acrylate [A-7] (manufactured by Wako Pure Chemical Industries, Ltd.) was mixed and a liquid where 10 g of acrylic acid [A-2] (manufactured by Tokyo Chemical Industry Co., Ltd.), and 1.0 g of V-601 (manufactured by Wako Pure Chemical Industries, Ltd.) were mixed) which was prepared in another container was added dropwise thereto for 2 hours. After completing the dropwise addition, 0.4 g of V-601 was added thereto. After that, a dispersion liquid of a precursor K-102 was obtained by cooling to room temperature after stirring at 95° C. for 2 hours. B-10 was obtained by dropwise adding K-102 into the 2 L three-neck flask which contained the dispersion liquid of K-101 for one hour. The concentration of the solid contents was 41.3% and the particle diameter was 194 nm.

Synthesis Example of Macromonomer M-1

147 g of toluene (manufactured by Wako Pure Chemical Industries, Ltd.) was added to a 500 mL three-neck flask to which a reflux cooling pipe and a gas introducing cock were attached and, after introducing nitrogen gas at flow rate of 200 mL/min for 10 minutes, the temperature was increased to 95° C. A liquid (a liquid where 30.0 g of methyl methacrylate (manufactured by Wako Pure Chemical Industries, Ltd.), 69.0 g of methyl lauryl methacrylate (manufactured by Wako Pure Chemical Industries, Ltd.), 1.0 g of acrylic acid (manufactured by Wako Pure Chemical Industries, Ltd.), and 2.0 g of V-601 (manufactured by Wako Pure Chemical Industries, Ltd.) were mixed) which was prepared in another container was added dropwise thereto for 2 hours. After completing the dropwise addition, 1.0 g of V-601 was added thereto. After stirring at 95° C. for 1 hour after that, 3.95 g of glycidyl methacrylate (manufactured by Tokyo Chemical Industry Co., Ltd.), 0.39 g of triethylamine (manufactured by Wako Pure Chemical Industries, Ltd.), and 2,2,6,6-tetramethyl piperidine I-oxyl (manufactured by Tokyo Chemical Industry Co., Ltd.) were added and stirred at 100° C. for 2 hours. The macromonomer M-1 was obtained by performing decantation and drying at 65° C. after cooling to room temperature, diluting using 1.5 L of toluene, and re-precipitating in methanol. The weight-average molecular weight was 9,300.

Probable structure formulas of the synthesized macromonomer and polymers are shown below.

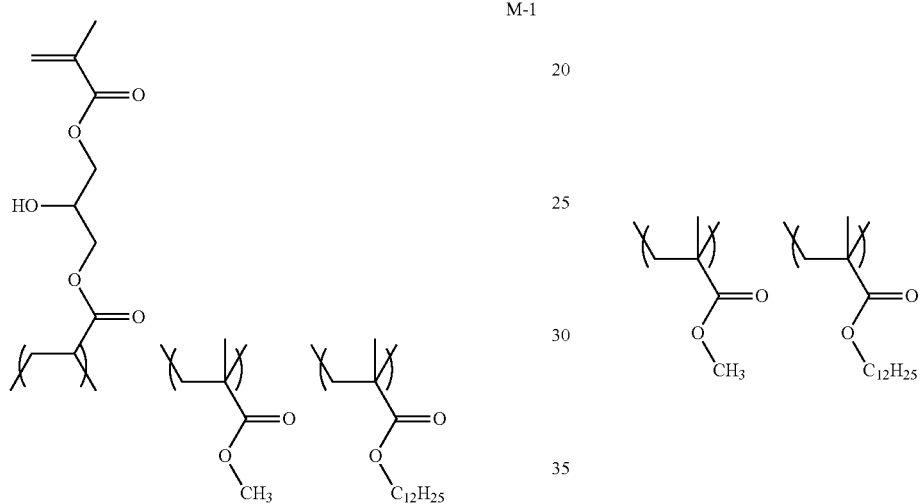

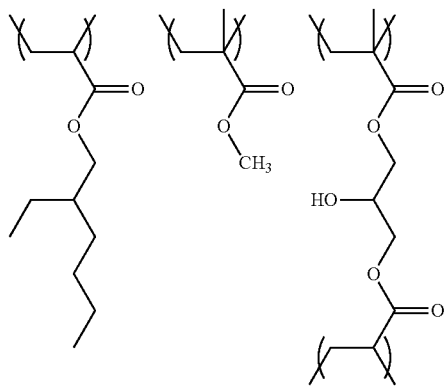

TABLE 1

| No. | MC1 | Parts | MC2 | Parts | MC3 | Parts | MS1 | Parts | MS2 | Parts | MM | Parts | Particle form |
|---|---|---|---|---|---|---|---|---|---|---|---|---|---|
| B-1 | A-4 | 63 | | | | | A-7 | 27 | | | M-1 | 10 | Single |
| B-2 | A-4 | 60 | A-48 | 3 | | | A-7 | 27 | | | M-1 | 10 | Single |
| B-3 | A-4 | 60 | | | | | A-7 | 27 | A-1 | 3 | M-1 | 10 | Single |
| B-4 | A-4 | 57 | A-48 | 3 | | | A-7 | 27 | A-1 | 3 | M-1 | 10 | Single |
| B-5 | A-39 | 57 | | | | | A-41 | 30 | A-1 | 3 | M-1 | 10 | Single |
| B-6 | A-4 | 40 | A-42 | 20 | | | A-7 | 27 | A-1 | 3 | M-1 | 10 | Single |
| B-7 | A-21 | 43 | A-59 | 7 | | | A-5 | 37 | A-1 | 3 | M-1 | 10 | Single |
| B-8 | A-14 | 60 | | | | | A-4 | 27 | A-1 | 3 | M-1 | 10 | Single |
| B-9 | A-60 | 30 | A-4 | 30 | | | A-7 | 27 | A-1 | 3 | M-1 | 10 | Single |
| B-10 | A-4 | 52 | A-63 | 5 | | | A-7 | 30 | A-2 | 3 | M-1 | 10 | Non-single |
| B-11 | A-4 | 57 | A-48 | 3 | | | A-15 | 20 | A-10 | 10 | M-1 | 10 | Single |
| B-12 | A-17 | 57 | A-53 | 3 | | | A-7 | 27 | A-28 | 3 | M-1 | 10 | Single |
| B-13 | A-4 | 57 | A-48 | 3 | | | A-7 | 27 | A-28 | 3 | M-1 | 10 | Single |
| B-14 | A-24 | 57 | A-57 | 3 | | | A-7 | 27 | A-1 | 3 | M-1 | 10 | Single |
| B-15 | A-4 | 53 | A-31 | 7 | A-48 | 3 | A-7 | 27 | | | M-1 | 10 | Single |
| B-16 | A-4 | 52 | A-44 | 5 | A-48 | 3 | A-7 | 27 | A-1 | 3 | M-1 | 10 | Single |
| B-17 | A-4 | 57 | A-48 | 3 | | | A-7 | 27 | A-26 | 3 | M-1 | 10 | Single |
| B-18 | A-4 | 57 | A-57 | 3 | | | A-7 | 27 | A-1 | 3 | M-1 | 10 | Single |
| B-19 | A-4 | 57 | A-58 | 3 | | | A-7 | 27 | A-1 | 3 | M-1 | 10 | Single |
| B-20 | A-4 | 57 | A-48 | 3 | | | A-70 | 27 | A-1 | 3 | M-1 | 10 | Single |
| B-21 | A-4 | 57 | A-48 | 3 | | | A-72 | 27 | A-1 | 3 | M-1 | 10 | Single |
| B-22 | A-4 | 55 | A-7 | 5 | | | A-6 | 27 | A-1 | 3 | M-1 | 10 | Single |
| B-23 | A-65 | 57 | A-48 | 3 | | | A-7 | 27 | A-1 | 3 | M-1 | 10 | Single |
| Bc-1 | A-4 | 57 | A-48 | 3 | | | A-7 | 27 | A-1 | 3 | M-1 | 10 | Single |

<Notes for Table>
The numbers in the table are parts by mass.
The numbers of the compounds refer to the examples of the exemplified compounds described above.
MC: A monomer which configures a core section
MS: A monomer which configures a shell section
MM: A macromonomer (Examples of Preparing Solid Electrolyte Composition)

After inserting 180 zirconia beads with a diameter of 5 mm into a 45 mL container made of zirconia (manufactured by Fritsch Co., Ltd.), and inserting 9.5 g of inorganic solid electrolyte LLT (manufactured by Toshima Manufacturing Co., Ltd.), 0.5 g of a binder B-1 (a solid content weight), and 15.0 g of heptane as a dispersing medium, a container was set in a planet ball mill manufactured by Fritsch Co., Ltd., mixing was continued at a rotation speed of 300 rpm for 2 hours, and a solid electrolyte composition S-1 was obtained. The average particle diameter of the prepared inorganic electrolyte particles was 50 μm.

TABLE 2

| Composition | Solid electrolyte | Binder | | Dispersing medium |
|---|---|---|---|---|
| S-1 | LLT | 95% | B-1 | 5% Heptane |
| S-2 | LLT | 95% | B-2 | 5% Heptane |
| S-3 | LLT | 95% | B-3 | 5% Heptane |
| S-4 | LLT | 95% | B-4 | 5% Heptane |
| S-5 | LLT | 95% | B-5 | 5% Heptane |
| S-6 | LLT | 95% | B-6 | 5% Heptane |
| S-7 | LLT | 95% | B-7 | 5% Heptane |
| S-8 | LLT | 95% | B-8 | 5% Heptane |
| S-9 | LLT | 95% | B-9 | 5% Heptane |
| S-10 | LLT | 95% | B-10 | 5% Heptane |
| S-11 | LLT | 95% | B-2 | 5% MEK |
| S-12 | LLZ | 95% | B-1 | 5% Heptane |
| S-13 | LLT | 95% | B-11 | 5% Heptane |
| S-14 | LLT | 95% | B-12 | 5% Heptane |
| S-15 | LLT | 95% | B-13 | 5% Heptane |
| S-16 | LLT | 95% | B-14 | 5% Heptane |
| S-17 | LLT | 95% | B-15 | 5% Heptane |
| S-18 | LLT | 95% | B-16 | 5% Heptane |
| S-19 | LLT | 95% | B-17 | 5% Heptane |
| S-20 | LLT | 95% | B-18 | 5% Heptane |
| S-21 | LLT | 95% | B-19 | 5% Heptane |
| S-22 | LLT | 95% | B-20 | 5% Heptane |
| S-23 | LLT | 95% | B-21 | 5% Heptane |
| S-24 | LLT | 95% | B-22 | 5% Heptane |
| S-25 | LLT | 95% | B-23 | 5% Heptane |
| T-1 | LLT | 100% | — | — Heptane |
| T-2 | LLT | 95% | PEO | 5% Heptane |
| T-3 | LLT | 95% | HBR | 5% Heptane |
| T-4 | LLT | 95% | Bc-1 | 5% Heptane |

<Notes for Table>
The numbers in the table are the mass ratio (%).
The numbers of the compounds refer to the examples of the exemplified compounds described above.
LLT: $Li_{0.33}La_{0.55}TiO_3$
LLZ: $Li_7La_3Zr_2O_{12}$
MEK: Methyl ethyl ketone
PEO: Polymer Particles Obtained by the Synthesis Method Below 700 parts of acrylic acid n-butyl, 200 parts of styrene, 5 parts of methacrylic acid, 10 parts of divinyl benzene, 25 parts of polyoxyethylene lauryl ether (manufactured by Kao Corporation, EMULGEN 108, a non-ionic surfactant, the number of carbon atoms of an alkyl group is 12, HLB value is 12.1) as an emulsifier, 1,500 parts of ion exchange water, and 15 parts of azobisbutyronitrile as a polymerization initiator were prepared in an autoclave and sufficiently stirred. After that, the temperature was increased to 80° C., and polymerization was performed. Then, after starting the polymerization, a latex of the polymer particles was obtained by cooling and stopping the polymerization reaction. The average particle diameter was 120 nm.

HBR: Polymer which was Obtained by the Synthesis Method Below 30 parts of cyclohexane and 10 parts of butadiene were added to an autoclave and 30 parts of an n-butyl lithium 14% tetrahydrofuran solution were added thereto. When the temperature was increased to 70° C., and the inversion ratio was 100%, 30 kg of butadiene and 120 parts of tetrahydrofuran were further added and reaction was performed at 70° C. When the inversion ratio was 100%, 30 parts of a dichlorosilane 20% tetrahydrofuran solution were added and by carrying out reaction for 20 minutes, a triblock polymer was obtained. After that, a block polymer was obtained by making the reaction liquid 70° C., adding 3 parts of n-butyl lithium, 3 parts of 2,6-di-t-butyl-p-cresol, 1 part of bis (cyclopentadienyl) titanium dichloride, and 2 parts of diethyl aluminum chloride, carrying out a reaction at a hydrogen pressure of 10 kg/cm² for 1 hour, distilling, and drying.

Table 3-1

| Cell configuration | | Binder | | | | Ionic conductivity (mS/cm) | | Ionic conductivity after high temperature storage (mS/cm) |
|---|---|---|---|---|---|---|---|---|
| No. | Electrolyte layer | Particle diameter (nm) | Tg 1 (° C.) | Tg 2 (° C.) | Binding property | Pressure | Non-pressure | |
| 101 | S-1 | 193 | 83 | −68 | 4 | 0.15 | 0.14 | 0.13 |
| 102 | S-2 | 185 | 103 | −68 | 4 | 0.16 | 0.15 | 0.14 |
| 103 | S-3 | 195 | 83 | −53 | 5 | 0.18 | 0.17 | 0.16 |
| 104 | S-4 | 187 | 103 | −53 | 5 | 0.18 | 0.18 | 0.18 |
| 105 | S-5 | 162 | 101 | −85 | 5 | 0.17 | 0.17 | 0.16 |
| 106 | S-6 | 178 | 95 | −53 | 5 | 0.18 | 0.17 | 0.16 |
| 107 | S-7 | 173 | 87 | −43 | 5 | 0.18 | 0.17 | 0.18 |
| 108 | S-8 | 179 | −72 | 87 | 4 | 0.14 | 0.13 | 0.1 |
| 109 | S-9 | 184 | 130 | −53 | 5 | 0.17 | 0.17 | 0.16 |
| 110 | S-10 | 194 | 81 | −40 | 4 | 0.15 | 0.13 | 0.11 |
| 111 | S-11 | 185 | 103 | −67 | 4 | 0.16 | 0.15 | 0.14 |
| 112 | S-12 | 193 | 83 | −68 | 4 | 0.15 | 0.13 | 0.13 |
| 113 | S-13 | 187 | 103 | −51 | 5 | 0.18 | 0.17 | 0.18 |
| 114 | S-14 | 185 | 70 | −53 | 4 | 0.16 | 0.14 | 0.13 |

-continued

| | | | | | | | | |
|---|---|---|---|---|---|---|---|---|
| 115 | S-15 | 193 | 103 | −52 | 5 | 0.18 | 0.18 | 0.18 |
| 116 | S-16 | 194 | 50 | −53 | 4 | 0.15 | 0.13 | 0.11 |
| 117 | S-17 | 182 | 93 | −68 | 5 | 0.18 | 0.17 | 0.16 |
| 118 | S-18 | 196 | 85 | −53 | 5 | 0.18 | 0.18 | 0.17 |
| 119 | S-19 | 187 | 103 | −49 | 5 | 0.18 | 0.18 | 0.18 |
| 120 | S-20 | 167 | 110 | −53 | 5 | 0.18 | 0.18 | 0.18 |
| 121 | S-21 | 158 | 122 | −53 | 5 | 0.18 | 0.18 | 0.18 |
| 122 | S-22 | 173 | 103 | −45 | 5 | 0.18 | 0.18 | 0.17 |
| 123 | S-23 | 168 | 103 | −53 | 5 | 0.18 | 0.18 | 0.17 |
| 124 | S-24 | 189 | 78 | 24 | 4 | 0.14 | 0.12 | 0.12 |
| 125 | S-25 | 183 | 110 | −53 | 5 | 0.18 | 0.18 | 0.17 |
| c11 | T-1 | | | | 1 | 0.14 | 0.02 | 0.1 |
| c12 | T-2 | 120 | −23 | — | 3 | 0.11 | 0.07 | 0.03 |
| c13 | T-3 | — | −52 | — | 3 | 0.09 | 0.06 | 0.03 |
| c14 | T-4 | 195 | 83 | 53 | 2 | 0.13 | 0.09 | 0.06 |

Table 3-2

| | Cell configuration | | | Binder | | | | Ionic conductivity (mS/cm) | | Ionic conductivity after high temperature storage (mS/cm) |
|---|---|---|---|---|---|---|---|---|---|---|
| No. | Cathode layer | Electrolyte layer | Anode layer | Particle diameter (nm) | Tg 1 (° C.) | Tg 2 (° C.) | Binding property | Pressure | Non-pressure | |
| 201 | LMO S-1 | S-1 | Graphite S-1 | 193 | 83 | −68 | 4 | 0.11 | 0.1 | 0.09 |
| 202 | LMO S-2 | S-2 | LTO S-2 | 185 | 103 | −68 | 4 | 0.12 | 0.11 | 0.12 |
| 203 | LCO S-2 | S-2 | Graphite S-2 | 185 | 103 | −68 | 4 | 0.12 | 0.11 | 0.11 |
| 204 | NMC S-3 | S-3 | Graphite S-3 | 195 | 83 | −53 | 5 | 0.13 | 0.12 | 0.11 |
| 205 | NMC S-4 | S-4 | LTO S-4 | 187 | 103 | −53 | 5 | 0.13 | 0.13 | 0.13 |
| 206 | LMO S-5 | S-5 | LTO S-5 | 162 | 101 | −85 | 4 | 0.13 | 0.11 | 0.12 |
| 207 | LMO S-8 | S-8 | LTO S-8 | 179 | −72 | 87 | 4 | 0.11 | 0.1 | 0.08 |
| 208 | NMC S-21 | S-21 | LTO S-21 | 158 | 122 | −53 | 5 | 0.13 | 0.13 | 0.13 |
| 209 | NMC S-22 | S-22 | LTO S-22 | 173 | 103 | −45 | 5 | 0.13 | 0.12 | 0.11 |
| 210 | NMC S-23 | S-23 | LTO S-23 | 168 | 103 | −53 | 5 | 0.13 | 0.12 | 0.11 |

<Notes for Table>

LMO; $LiMn_2O_4$ lithium manganate

LTO; $Li_4Ti_5O_{12}$ lithium titanate

LCO; $LiCoO_2$ lithium cobalt oxide

NMC; $Li(Ni_{1/3}Mn_{1/3}Co_{1/3})O_2$ nickel, manganese, and lithium cobalt oxide Tg 1 refers to Tg of the precursor K-11 (core) which was formed by previous dropwise addition and Tg 2 refers to Tg of a polymer (shell) which was obtained by polymerizing a monomer which was added dropwise thereto later in the same manner as the precursor K-11 described above in another container. Here, since two Tgs are measured after forming the core-shell particles, it is possible to specify the difference between the Tgs.

(Example of Preparing Composition for Secondary Battery Cathode)

100 parts of lithium cobalt oxide (the average particle diameter is 10 μm), 5 parts of acetylene black, 75 parts of the solid electrolyte composition S-1 which was obtained as described above, and 270 parts of MEK were added to a planetary mixer (TK HIVIS MIX, manufactured by PRIMIX Corporation) and stirred at 40 rpm for 1 hour.

(Example of Preparing Composition for Secondary Battery Anode)

100 parts of lithium titanate (product name "ENER-MIGHT LT-106", manufactured by Ishihara Sangyo Kaisha, Ltd.) (the average particle diameter is 6 μm), 5 parts of acetylene black, 75 parts of the solid electrolyte composition S-1 which was obtained as described above, and 270 parts of MEK were added to a planetary mixer (TK HIVIS MIX, manufactured by PRIMIX Corporation) and stirred at 40 rpm for 1 hour.

(Example of Manufacturing Cathode for Secondary Battery)

The composition for a secondary battery cathode which was obtained as described above was coated on an aluminum foil with a thickness of 20 μm by an applicator which has arbitrary clearance, heated at 80° C. for 1 hour, further heated at 110° C. for 1 hour, and dried. After that, a cathode for a secondary battery was obtained by heating and pressurizing to an arbitrary density using a heat press machine.

(Example of Manufacturing Electrode Sheet for Secondary Battery)

The solid electrolyte composition which was obtained as described above was coated on the cathode for a secondary battery which was obtained as described above (an aluminum foil in a case of manufacturing a solid electrolyte sheet) by an applicator which has arbitrary clearance, heated at 80° C. for 2 hours, and dried.

After that, the composition for a secondary battery anode which was obtained as described above (not coated in a case of manufacturing a solid electrolyte sheet) was further coated thereon, heated at 80° C. for 2 hours, and dried. An electrode sheet for a secondary battery was obtained by putting a copper foil with a thickness of 20 µm on the anode layer and heating and pressurizing to an arbitrary density using a heat press machine.

<Evaluation of Binding Property>

An adhesive tape was adhered on the electrode sheet and when peeling off at a certain speed, it was represented by a ratio of an area of the peeled portion.

5: 0%
4: More than 0% and less than 5%
3: 5% or more and less than 20%
2: 20% or more and less than 50%
1: 50% or more <Measurement of Ionic Conductivity>

The electrode sheet of a secondary battery which was obtained as described above was cut out into a disc form with a diameter of 14.5 mm and a coin battery was produced. The electrode sheet was interposed in a jig able to apply pressure of 500 kgf/cm² between electrodes from the outer section of the coin battery and used for various types of electrical and chemical measurements.

Figure 3:
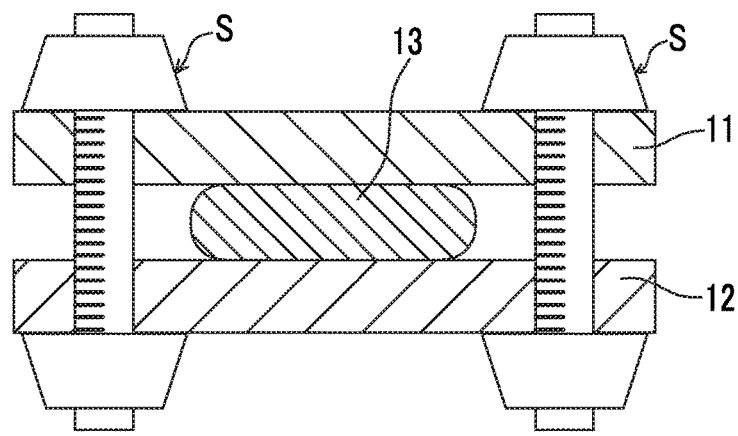
FIG. 3 is a cross-sectional diagram which schematically shows a testing apparatus which was used in the Examples.

Using the coin battery which was obtained as described above, the electrical and chemical measurements were obtained in a constant-temperature tank of 30° C. by an alternating current impedance method. At this time, a testing body shown in FIG. 3 was used for pressurizing the battery. 11 is an upper support board, 12 is a lower support board, 13 is a coin battery, and S is a screw.

<Measurement of Ionic Conductivity after High Temperature Storage>

After leaving the coin battery which was obtained as described above in a 70° C. constant-temperature tank for one week, the ionic conductivity was obtained in the 30° C. constant-temperature tank by an alternating current impedance method.

<Measurement of Particle Diameter>

(Measurement of Average Particle Diameter of Binder)

The average particle diameter of the binder particles was measured in the steps below.

A dispersion liquid of 1 mass % was prepared using an arbitrary solvent (a dispersing medium used for preparing a solid electrolyte composition, heptane in the case of the binder B-1) using the binder which was prepared as described above. Using the dispersion liquid sample, the volume average particle diameter of the resin particles was measured using a laser diffraction/scattered particle diameter distribution measuring apparatus LA-920 (manufactured by Horiba Ltd.).

<Method for Measuring Tg>

The glass transition point was measured under the conditions below using the dry sample described above using a differential scanning calorimeter (manufactured by Seiko Instruments Inc., DSC7000). The measurement was carried out twice using the same sample and the second measurement result was adopted.

Atmosphere in measurement room: nitrogen (50 mL/min)
Temperature increasing speed: 5° C./min
Measurement starting temperature: −100° C.
Measurement ending temperature: 200° C.
Sample pan: pan made of aluminum
Mass of measured sample: 5 mg Calculation of Tg: Tg was calculated by rounding after the decimal point of an intermediate temperature between the decrease starting point and the decrease ending point in the DSC chart.

Confirmation of the battery performance was performed in the same manner as the test 101 apart from changing the macromonomer to M2 to M5. As a result, it was confirmed that it was possible to obtain favorable performance by any thereof.

TABLE 4

| | Monomer | | | Particle diameter (nm) | Tg 1 (° C.) | Tg 2 (° C.) | Binding property | Ionic conductivity (mS/cm) | |
|---|---|---|---|---|---|---|---|---|---|
| | | | | | | | | Binder Pressured state | Non-pressured state |
| No. | MC1 | MS1 | MM | | | | | | |
| 101 | A-4 | A-7 | M-1 | 193 | 83 | −68 | 4 | 0.15 | 0.14 |
| 301 | A-4 | A-7 | M-2 | 178 | 83 | −68 | 4 | 0.15 | 0.14 |
| 302 | A-4 | A-7 | M-3 | 183 | 83 | −68 | 4 | 0.14 | 0.14 |
| 303 | A-4 | A-7 | M-4 | 191 | 83 | −68 | 4 | 0.15 | 0.13 |
| 304 | A-4 | A-7 | M-5 | 186 | 83 | −68 | 4 | 0.15 | 0.13 |

Synthesis Example of Macromonomer M-2

A macromonomer M-2 was obtained by reacting glycidyl methacrylate (manufactured by Tokyo Chemical Industry Co., Ltd.) with a self-condensate (GPC polystyrene standard number average molecular weight: 2,000) of 12-hydroxy stearic acid (manufactured by Wako Pure Chemical Industries, Ltd.). The weight-average molecular weight was 10000.

The estimated structure of the macromonomer M-2 is as below.

Macromonomer M-2

Synthesis Example of Macromonomer M-3

A macromonomer M-3 was obtained by reacting 4-hydroxy styrene (manufactured by Wako Pure Chemical Industries, Ltd.) with a self-condensate (GPC polystyrene standard number average molecular weight: 2,000) of 12-hydroxy stearic acid (manufactured by Wako Pure Chemical Industries, Ltd.). The weight-average molecular weight of the macromonomer M-3 was 4600.

Synthesis Example of Macromonomer M-4

A macromonomer M-4 (GPC polystyrene standard weight-average molecular weight: 120,000) was obtained by reacting glycidyl methacrylate (manufactured by Tokyo Chemical Industry Co., Ltd.) with a fluoroethylene vinyl ether copolymer (manufactured by Asahi Glass Co., Ltd.).

(Macromonomer M-5)

A single terminal methacryloyl poly-n-butyl acrylate oligomer (Mw=13,000, product name: AB-6, manufactured by Toagosei Co., Ltd.) was used as a macromonomer M-5.

Description was given of the present invention along with the embodiments thereof and diagrams; however, unless otherwise pointed out, our invention is not limited by any of the fine details of the description and should be widely interpreted within the spirit and the range of the invention shown in attached claims.

EXPLANATION OF REFERENCES

1: anode current collector
2: anode active material layer
3: inorganic solid electrolyte layer
4: cathode active material layer
5: cathode current collector
6: operation site
10: all-solid secondary battery

What is claimed is:

1. A solid electrolyte composition comprising:
an inorganic solid electrolyte;
a binder which is formed of core-shell type particles which have a core section and a shell section; and
a dispersive medium,
wherein a difference between a glass transition temperature of a polymer compound which forms the core section and a glass transition temperature of a polymer compound which forms the shell section is 50° C. or more, and
said polymer compound which forms one or both of the core section and the shell section includes a structure unit which is derived from a macromonomer (X) having a weight-average molecular weight of 2000 or more.

2. The solid electrolyte composition according to claim 1, wherein the polymer compound which forms the one or both of the core section and the shell section includes a structure unit which is represented by Formula (1) or (2) below,

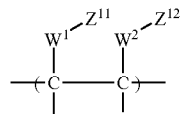

(1)

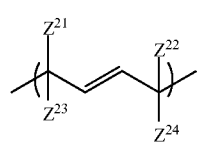

(2)

in the formulas, $W^1$ to $W^4$ each independently represent a single bond or a divalent linking group, $Z^{11}$ to $Z^{14}$ and $Z^{21}$ to $Z^{24}$ each independently represent a hydrogen atom or a substituent,
where, at least one of $Z^{11}$, ..., or $Z^{14}$ and at least one of $Z^{21}$, ..., or $Z^{24}$ are a substituent,
$W^1$ to $W^4$, $Z^{11}$ to $Z^{14}$, and $Z^{21}$ to $Z^{24}$ may bond with each other to form a cyclic structure, and
$Z^{11}$ to $Z^{14}$ and $Z^{21}$ to $Z^{24}$ may be linked with another polymer chain which is represented by Formula (1) or (2).

3. The solid electrolyte composition according to claim 1, wherein an average particle diameter of the core-shell type particles which form the binder is 10 nm or more and 1,000 nm or less.

4. The solid electrolyte composition according to claim 1, wherein the polymer compound which forms one or both of the core section and the shell section has at least one selected from the group (b) of functional groups below,
group (b) of functional groups
a carbonyl group, an amino group, a carboxyl group, a sulfonic acid group, a phosphoric acid group, a phosphonic acid group, a hydroxy group, an oxy group, a cyano group, a sulfide group, and an imino group.

5. The solid electrolyte composition according to claim 1, wherein the polymer compound which forms one or both of the core section and the shell section includes a repeating unit which is derived from a monomer which is selected from a (meth)acrylic acid monomer, a (meth)acrylic acid ester monomer, and a (meth)acrylonitrile monomer.

6. The solid electrolyte composition according to claim 1, wherein the macromonomer (X) includes a polymerizable double bond and a linear hydrocarbon structure unit with 6 or more carbon atoms.

7. The solid electrolyte composition according to claim 1, wherein the macromonomer (X) is a monomer which is represented by any one of Formulas (b-13a) to (b-13c) below or a monomer which has a repeating unit which is represented by any one of Formulas (b-14a) to (b-14c) below,

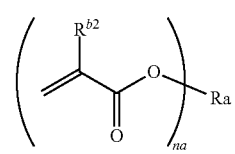

(b-13a)

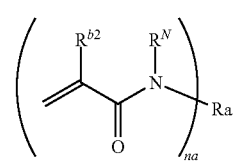

(b-13b)

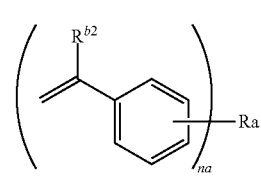

(b-13c)

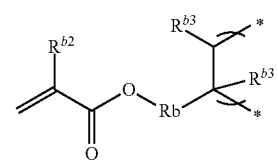

(b-14a)

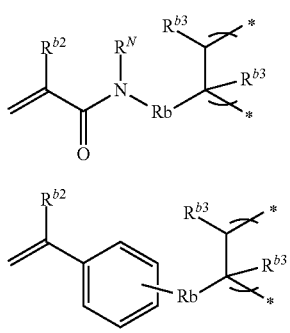

in the formulas, $R^{b2}$ and $R^{b3}$ each independently represent a hydrogen atom, a hydroxy group, a cyano group, a halogen atom, an alkyl group, an alkenyl group, an alkynyl group, or an aryl group, Ra and Rb each independently represent a linking group, where, Ra is a monovalent substituent when na is 1, na represents an integer of 1 to 6, and $R^N$ is a hydrogen atom, an alkyl group with 1 to 6 carbon atoms, or an aryl group with 6 to 10 carbon atoms.

8. The solid electrolyte composition according to claim 1, wherein the glass transition temperature of the core section of the binder is higher than the glass transition temperature of the shell section, or the glass transition temperature of the shell section of the binder is higher than the glass transition temperature of the core section.

9. The solid electrolyte composition according to claim 1, wherein the glass transition temperature of the core section of the binder is 80° C. or more and the glass transition temperature of the shell section is 30° C. or less, or the glass transition temperature of the shell section of the binder is 80° C. or more and the glass transition temperature of the core section is 30° C. or less.

10. The solid electrolyte composition according to claim 1, wherein the average particle diameter of the core-shell type particles which form the binder is 200 nm or less.

11. The solid electrolyte composition according to claim 1, wherein the polymer compound which forms one or both of the core section and the shell section has at least one selected from the group (c) of functional groups below, group (c) of functional groups a carboxyl group, a sulfonic acid group, a phosphoric acid group, and a hydroxy group.

12. The solid electrolyte composition according to claim 1, further comprising:
an active material which is able to insert and discharge metal ions which belong to group I or group II in the periodic table.

13. The solid electrolyte composition according to claim 1,
wherein the binder particles are contained at 0.1 parts by mass or more and 20 parts by mass or less with respect to 100 parts by mass of the inorganic solid electrolyte.

14. The solid electrolyte composition according to claim 1,
wherein the dispersive medium is selected from an alcohol compound solvent, an amide compound solvent, a ketone compound solvent, an ether compound solvent, an aromatic compound solvent, an aliphatic compound solvent, and a nitrile compound solvent.

15. The solid electrolyte composition according to claim 1,
wherein a ratio of a mass of the binder core section and a mass of the shell section is 5 parts by mass or more and 200 parts by mass or less of the shell section with respect to 100 parts by mass of the core section.

16. An electrode sheet for a battery where the solid electrolyte composition according to claim 1 is formed into a film on a metallic foil.

17. An all-solid secondary battery comprising:
a cathode active material layer;
an anode active material layer; and
an inorganic solid electrolyte layer,
wherein at least one of the cathode active material layer, the anode active material layer, or the inorganic solid electrolyte layer is formed of the solid electrolyte composition according to claim 1.

18. A method for manufacturing an electrode sheet for a battery, the method comprising:
arranging the solid electrolyte composition according to claim 1 on a metallic foil, and
forming the composition into a film.

19. A method for manufacturing an all-solid secondary battery via the manufacturing method according to claim 18.

20. The solid electrolyte according to claim 1, wherein the macromonomer (X) has a weight-average molecular weight of 500,000 or less.

* * * * *